United States Patent
Kotler et al.

(10) Patent No.: US 12,468,810 B2
(45) Date of Patent: Nov. 11, 2025

(54) CLASSIFYING CYBERSECURITY THREATS USING MACHINE LEARNING ON NON-EUCLIDEAN DATA

(71) Applicant: SENTINELONE, INC., Mountain View, CA (US)

(72) Inventors: Ido Kotler, Tel Aviv (IL); Gal Braun, Ness Ziona (IL); Dean Langsam, Ness Ziona (IL); Guy Jacoby, Ness Ziona (IL)

(73) Assignee: SENTINELONE, INC., Mountain View, CA (US)

( * ) Notice: Subject to any disclaimer, the term of this patent is extended or adjusted under 35 U.S.C. 154(b) by 22 days.

(21) Appl. No.: 18/412,981

(22) Filed: Jan. 15, 2024

(65) Prior Publication Data

US 2024/0241956 A1   Jul. 18, 2024

Related U.S. Application Data

(60) Provisional application No. 63/479,956, filed on Jan. 13, 2023.

(51) Int. Cl.
| | |
|---|---|
| *G06F 21/50* | (2013.01) |
| *G06F 21/54* | (2013.01) |
| *G06F 21/55* | (2013.01) |
| *G06F 21/56* | (2013.01) |

(52) U.S. Cl.
CPC .......... *G06F 21/566* (2013.01); *G06F 21/54* (2013.01); *G06F 21/554* (2013.01)

(58) Field of Classification Search
CPC ....... G06F 21/566; G06F 21/54; G06F 21/554
See application file for complete search history.

(56) References Cited

U.S. PATENT DOCUMENTS

| | | |
|---|---|---|
| 4,979,118 A | 12/1990 | Kheradpir |
| 5,311,593 A | 5/1994 | Carmi |
| 5,754,938 A | 5/1998 | Herz et al. |
| 6,026,474 A | 2/2000 | Carter et al. |
| 6,154,844 A | 11/2000 | Touboul et al. |
| 6,157,953 A | 12/2000 | Chang et al. |
| 6,728,716 B1 | 4/2004 | Bhattacharya et al. |
| 6,804,780 B1 | 10/2004 | Touboul |
| 6,836,888 B1 | 12/2004 | Basu et al. |

(Continued)

FOREIGN PATENT DOCUMENTS

| | | |
|---|---|---|
| CN | 103607399 A | 2/2014 |
| CN | 109446755 A | 3/2019 |

(Continued)

OTHER PUBLICATIONS

AEfficient Virus Detection Using Dynamic Instruction Sequencesa—May 2009 (Year: 2009).

(Continued)

*Primary Examiner* — Normin Abedin
(74) *Attorney, Agent, or Firm* — Perkins Coie LLP

(57) ABSTRACT

Systems, methods, and devices for cybersecurity are disclosed herein that can employ machine learning approaches with a better understanding of the complex relationships and sequencing associated with behavior-based data, and that can effectively apply machine learning for behavior-based analysis, malware detection, and identifying and classifying threats in real-time.

14 Claims, 12 Drawing Sheets

(56) References Cited

U.S. PATENT DOCUMENTS

| | | |
|---|---|---|
| 7,076,696 B1 | 7/2006 | Stringer |
| 7,093,239 B1 | 8/2006 | Van der Made |
| 7,181,769 B1 | 2/2007 | Keanini et al. |
| 7,225,468 B2 | 5/2007 | Waisman et al. |
| 7,299,294 B1 | 11/2007 | Bruck et al. |
| 7,305,546 B1 | 12/2007 | Miller |
| 7,322,044 B2 | 1/2008 | Hrastar |
| 7,464,407 B2 | 12/2008 | Nakae et al. |
| 7,530,106 B1 | 5/2009 | Zaitsev et al. |
| 7,543,269 B2 | 6/2009 | Krueger et al. |
| 7,546,587 B2 | 6/2009 | Marr et al. |
| 7,574,740 B1 | 8/2009 | Kennis |
| 7,596,807 B2 | 9/2009 | Ptacek et al. |
| 7,596,808 B1 | 9/2009 | Wilkinson et al. |
| 7,665,139 B1 | 2/2010 | Szor et al. |
| 7,710,933 B1 | 5/2010 | Sundaralingam et al. |
| 7,739,516 B2 | 6/2010 | Brender et al. |
| 7,832,012 B2 | 11/2010 | Huddleston |
| 7,882,538 B1 | 2/2011 | Palmer |
| 7,890,612 B2 | 2/2011 | Todd et al. |
| 7,937,755 B1 | 5/2011 | Guruswamy |
| 7,958,549 B2 | 6/2011 | Nakae et al. |
| 7,975,018 B2 | 7/2011 | Unrau et al. |
| 7,984,129 B2 | 7/2011 | Vaught |
| 8,015,605 B2 | 9/2011 | Yegneswaran et al. |
| 8,024,795 B2 | 9/2011 | Newton |
| 8,042,186 B1 | 10/2011 | Polyakov et al. |
| 8,056,134 B1 | 11/2011 | Ogilvie |
| 8,065,722 B2 | 11/2011 | Barford et al. |
| 8,078,556 B2 | 12/2011 | Adi et al. |
| 8,082,471 B2 | 12/2011 | Khan |
| 8,131,281 B1 | 3/2012 | Hildner et al. |
| 8,141,154 B2 | 3/2012 | Gruzman et al. |
| 8,156,556 B2 | 4/2012 | Krishnamurthy |
| 8,171,545 B1 | 5/2012 | Cooley et al. |
| 8,181,033 B1 | 5/2012 | Paul et al. |
| 8,181,250 B2 | 5/2012 | Rafalovich et al. |
| 8,204,984 B1 | 6/2012 | Aziz et al. |
| 8,205,035 B2 | 6/2012 | Reddy et al. |
| 8,230,505 B1 | 7/2012 | Ahrens et al. |
| 8,239,947 B1 | 8/2012 | Glick et al. |
| 8,296,842 B2 | 10/2012 | Singh et al. |
| 8,327,442 B2 | 12/2012 | Herz et al. |
| 8,353,033 B1 | 1/2013 | Chen et al. |
| 8,370,931 B1 | 2/2013 | Chien et al. |
| 8,375,444 B2 | 2/2013 | Aziz et al. |
| 8,375,447 B2 | 2/2013 | Amoroso et al. |
| 8,413,238 B1 | 4/2013 | Sutton |
| 8,413,241 B2 | 4/2013 | Weeks et al. |
| 8,418,250 B2 | 4/2013 | Morris et al. |
| 8,438,386 B2 | 5/2013 | Hegli et al. |
| 8,438,626 B2 | 5/2013 | Anderson et al. |
| 8,443,442 B2 | 5/2013 | Wang et al. |
| 8,474,044 B2 | 6/2013 | Zawadowskiy et al. |
| 8,488,466 B2 | 7/2013 | Breslin et al. |
| 8,528,057 B1 | 9/2013 | Garrett |
| 8,528,087 B2 | 9/2013 | Hsu et al. |
| 8,538,578 B2 | 9/2013 | Battles et al. |
| 8,539,578 B1 | 9/2013 | Zhou et al. |
| 8,539,582 B1 | 9/2013 | Aziz et al. |
| 8,549,643 B1 | 10/2013 | Shou |
| 8,555,385 B1 | 10/2013 | Bhatkar et al. |
| 8,561,177 B1 | 10/2013 | Aziz et al. |
| 8,566,946 B1 | 10/2013 | Aziz et al. |
| 8,607,054 B2 | 12/2013 | Ramarathinam et al. |
| 8,607,340 B2 | 12/2013 | Wright |
| 8,627,475 B2 | 1/2014 | Loveland et al. |
| 8,677,494 B2 | 3/2014 | Edery et al. |
| 8,713,306 B1 | 4/2014 | Bennett |
| 8,719,937 B2 | 5/2014 | Sundaram et al. |
| 8,725,898 B1 | 5/2014 | Pradeep |
| 8,726,389 B2 | 5/2014 | Morris et al. |
| 8,732,296 B1 | 5/2014 | Thomas et al. |
| 8,752,173 B2 | 6/2014 | Yadav |
| 8,789,135 B1 | 7/2014 | Pani |
| 8,793,151 B2 | 7/2014 | Delzoppo et al. |
| 8,806,638 B1 | 8/2014 | Mani |
| 8,821,242 B2 | 9/2014 | Hinman et al. |
| 8,839,369 B1 | 9/2014 | Dai et al. |
| 8,844,041 B1 | 9/2014 | Kienzle et al. |
| 8,849,880 B2 | 9/2014 | Thelen |
| 8,850,582 B2 | 9/2014 | Endoh et al. |
| 8,880,435 B1 | 11/2014 | Catlett et al. |
| 8,881,282 B1 | 11/2014 | Aziz et al. |
| 8,893,278 B1 | 11/2014 | Chechik |
| 8,898,788 B1 | 11/2014 | Aziz et al. |
| 8,904,527 B2 | 12/2014 | Dawson et al. |
| 8,943,594 B1 | 1/2015 | Arrowood |
| 8,949,986 B2 | 2/2015 | Ben-Shalom et al. |
| 8,959,338 B2 | 2/2015 | Snow et al. |
| 8,973,142 B2 | 3/2015 | Shulman et al. |
| 8,984,637 B2 | 3/2015 | Karecha et al. |
| 9,009,829 B2 | 4/2015 | Stolfo et al. |
| 9,027,135 B1 | 5/2015 | Aziz |
| 9,043,920 B2 | 5/2015 | Gula et al. |
| 9,081,747 B1 | 7/2015 | Tabieros et al. |
| 9,117,078 B1 | 8/2015 | Chien et al. |
| 9,141,792 B2 | 9/2015 | Baluda et al. |
| 9,166,993 B1 | 10/2015 | Liu |
| 9,185,136 B2 | 11/2015 | Dulkin et al. |
| 9,195,480 B2 | 11/2015 | Wang et al. |
| 9,197,601 B2 | 11/2015 | Pasdar |
| 9,213,838 B2 | 12/2015 | Lu |
| 9,225,734 B1 | 12/2015 | Hastings |
| 9,240,976 B1 | 1/2016 | Murchison |
| 9,246,774 B2 | 1/2016 | Mataitis et al. |
| 9,270,690 B2 | 2/2016 | Kraitsman et al. |
| 9,305,165 B2 | 4/2016 | Snow et al. |
| 9,329,973 B2 | 5/2016 | Bhuyan |
| 9,330,259 B2 | 5/2016 | Klein et al. |
| 9,356,942 B1 | 5/2016 | Joffe |
| 9,356,950 B2 | 5/2016 | Vissamsetty et al. |
| 9,369,476 B2 | 6/2016 | Chekina et al. |
| 9,386,034 B2 | 7/2016 | Cochenour |
| 9,398,001 B1 | 7/2016 | Tidd |
| 9,407,602 B2 | 8/2016 | Feghali et al. |
| 9,413,721 B2 | 8/2016 | Morris et al. |
| 9,430,646 B1 | 8/2016 | Mushtaq et al. |
| 9,432,360 B1 | 8/2016 | Triandopoulos et al. |
| 9,438,614 B2 | 9/2016 | Herz |
| 9,495,188 B1 | 11/2016 | Ettema et al. |
| 9,503,470 B2 | 11/2016 | Gertner et al. |
| 9,547,516 B2 | 1/2017 | Thakkar et al. |
| 9,578,045 B2 | 2/2017 | Jaroch et al. |
| 9,591,006 B2 | 3/2017 | Siva et al. |
| 9,601,000 B1 | 3/2017 | Gruss et al. |
| 9,602,531 B1 | 3/2017 | Wallace et al. |
| 9,606,893 B2 | 3/2017 | Gupta et al. |
| 9,607,146 B2 | 3/2017 | Sridhara et al. |
| 9,609,019 B2 | 3/2017 | Vissamsetty et al. |
| 9,628,498 B1 | 4/2017 | Aziz et al. |
| 9,641,544 B1 | 5/2017 | Treat et al. |
| 9,641,550 B2 | 5/2017 | Kraitsman et al. |
| 9,705,904 B1 | 7/2017 | Davis et al. |
| 9,710,648 B2 | 7/2017 | Weingarten et al. |
| 9,712,547 B2 | 7/2017 | Touboul et al. |
| 9,749,349 B1 | 8/2017 | Czarny et al. |
| 9,769,204 B2 | 9/2017 | Vissamsetty et al. |
| 9,772,832 B2 | 9/2017 | Rubio |
| 9,781,148 B2 | 10/2017 | Mahaffey et al. |
| 9,807,092 B1 | 10/2017 | Gutzmann |
| 9,807,115 B2 | 10/2017 | Kolton et al. |
| 9,813,451 B2 | 11/2017 | Honda et al. |
| 9,871,766 B2 | 1/2018 | Syed et al. |
| 9,877,210 B1 | 1/2018 | Hildner et al. |
| 9,888,032 B2 | 2/2018 | Dekel et al. |
| 9,898,763 B1 | 2/2018 | Vaynblat et al. |
| 9,942,270 B2 | 4/2018 | Vissamsetty et al. |
| 10,025,928 B2 | 7/2018 | Jaroch et al. |
| 10,044,675 B1 | 8/2018 | Ettema et al. |
| 10,102,374 B1 | 10/2018 | Cohen et al. |
| 10,169,586 B2 | 1/2019 | Maciejak et al. |
| 10,237,282 B2 | 3/2019 | Nelson et al. |
| 10,250,636 B2 | 4/2019 | Vissamsetty et al. |

(56) References Cited

U.S. PATENT DOCUMENTS

| | | |
|---|---|---|
| 10,257,224 B2 | 4/2019 | Jaroch et al. |
| 10,284,591 B2 | 5/2019 | Giuliani et al. |
| 10,375,110 B2 | 8/2019 | Vissamsetty et al. |
| 10,382,484 B2 | 8/2019 | Shayevitz et al. |
| 10,476,891 B2 | 11/2019 | Vissamsetty et al. |
| 10,509,905 B2 | 12/2019 | Gupta et al. |
| 10,542,044 B2 | 1/2020 | Vissamsetty et al. |
| 10,567,431 B2 | 2/2020 | Vissamsetty et al. |
| 10,574,698 B1 | 2/2020 | Sharifi Mehr |
| 10,599,842 B2 | 3/2020 | Vissametty et al. |
| 10,599,844 B2 | 3/2020 | Schmidtler et al. |
| 10,609,074 B2 | 3/2020 | Vissamsetty et al. |
| 10,757,090 B2 | 8/2020 | Kahol et al. |
| 10,826,941 B2 | 11/2020 | Jain et al. |
| 10,855,671 B2 | 12/2020 | Kahol et al. |
| 10,938,854 B2 | 3/2021 | Strogov et al. |
| 11,032,301 B2 | 6/2021 | Mandrychenko et al. |
| 11,038,658 B2 | 6/2021 | Vissamsetty et al. |
| 11,171,974 B2 | 11/2021 | Gertner et al. |
| 11,470,115 B2 | 10/2022 | Vissamsetty et al. |
| 11,481,503 B2 | 10/2022 | Gitelman et al. |
| 11,507,663 B2 | 11/2022 | Cohen et al. |
| 11,522,894 B2 | 12/2022 | Weingarten et al. |
| 11,579,857 B2 | 2/2023 | Montag et al. |
| 11,580,218 B2 | 2/2023 | Salem et al. |
| 11,615,184 B2 | 3/2023 | Kutt et al. |
| 11,695,800 B2 | 7/2023 | Vissamsetty et al. |
| 11,734,303 B2 | 8/2023 | Cruanes et al. |
| 11,888,897 B2 | 1/2024 | Vissamsetty et al. |
| 11,997,139 B2 | 5/2024 | Vissamsetty et al. |
| 2002/0010800 A1 | 1/2002 | Riley et al. |
| 2002/0016826 A1 | 2/2002 | Johansson et al. |
| 2002/0078382 A1 | 6/2002 | Sheikh et al. |
| 2002/0093917 A1 | 7/2002 | Knobbe et al. |
| 2002/0095607 A1 | 7/2002 | Lin-Hendel |
| 2002/0178374 A1 | 11/2002 | Swimmer et al. |
| 2002/0194489 A1 | 12/2002 | Almogy et al. |
| 2003/0065950 A1 | 4/2003 | Yarborough |
| 2003/0145225 A1 | 7/2003 | Bruton et al. |
| 2003/0145226 A1 | 7/2003 | Bruton et al. |
| 2003/0152034 A1 | 8/2003 | Zhang et al. |
| 2003/0188189 A1 | 10/2003 | Desai et al. |
| 2003/0223367 A1 | 12/2003 | Shay et al. |
| 2004/0083369 A1 | 4/2004 | Erlingsson et al. |
| 2004/0172557 A1 | 9/2004 | Nakae et al. |
| 2004/0243699 A1 | 12/2004 | Koclanes et al. |
| 2004/0255157 A1 | 12/2004 | Ghanea-Hercock |
| 2005/0050353 A1 | 3/2005 | Thiele et al. |
| 2005/0076235 A1 | 4/2005 | Ormazabal et al. |
| 2005/0076238 A1 | 4/2005 | Ormazabal et al. |
| 2005/0108562 A1 | 5/2005 | Khazan et al. |
| 2005/0138402 A1 | 6/2005 | Yoon et al. |
| 2005/0160480 A1 | 7/2005 | Birt et al. |
| 2005/0198507 A1 | 9/2005 | Brender et al. |
| 2005/0204157 A1 | 9/2005 | Johnson |
| 2005/0223239 A1 | 10/2005 | Dotan |
| 2005/0240906 A1 | 10/2005 | Kinderknecht et al. |
| 2005/0240989 A1 | 10/2005 | Kim et al. |
| 2006/0053490 A1 | 3/2006 | Herz et al. |
| 2006/0085543 A1 | 4/2006 | Hrastar et al. |
| 2006/0101515 A1 | 5/2006 | Amoroso et al. |
| 2006/0126522 A1 | 6/2006 | Oh |
| 2006/0161989 A1 | 7/2006 | Reshef et al. |
| 2006/0203774 A1 | 9/2006 | Carrion-Rodrigo |
| 2006/0209701 A1 | 9/2006 | Zhang et al. |
| 2006/0230129 A1 | 10/2006 | Swami et al. |
| 2006/0236401 A1 | 10/2006 | Fosdick |
| 2007/0022090 A1 | 1/2007 | Graham |
| 2007/0025374 A1 | 2/2007 | Stefan et al. |
| 2007/0067623 A1 | 3/2007 | Ward |
| 2007/0097976 A1 | 5/2007 | Wood et al. |
| 2007/0100905 A1 | 5/2007 | Masters et al. |
| 2007/0101431 A1 | 5/2007 | Clift et al. |
| 2007/0115993 A1 | 5/2007 | Cohen |
| 2007/0143827 A1 | 6/2007 | Nicodemus et al. |
| 2007/0143851 A1 | 6/2007 | Nicodemus et al. |
| 2007/0177499 A1 | 8/2007 | Gavrilescu et al. |
| 2007/0208822 A1 | 9/2007 | Wang et al. |
| 2007/0208936 A1 | 9/2007 | Ramos Robles |
| 2007/0209070 A1 | 9/2007 | Yadav |
| 2007/0226320 A1 | 9/2007 | Hager et al. |
| 2007/0240215 A1 | 10/2007 | Flores et al. |
| 2007/0250930 A1 | 10/2007 | Aziz et al. |
| 2007/0266422 A1 | 11/2007 | Germano et al. |
| 2007/0282782 A1 | 12/2007 | Carey et al. |
| 2008/0005782 A1 | 1/2008 | Aziz |
| 2008/0018927 A1 | 1/2008 | Martin et al. |
| 2008/0022000 A1 | 1/2008 | Furuya et al. |
| 2008/0034429 A1 | 2/2008 | Schneider |
| 2008/0046989 A1 | 2/2008 | Wahl |
| 2008/0060074 A1 | 3/2008 | Okuyama |
| 2008/0071728 A1 | 3/2008 | Lim |
| 2008/0082722 A1 | 4/2008 | Savagaonkar et al. |
| 2008/0083034 A1 | 4/2008 | Kim et al. |
| 2008/0098476 A1 | 4/2008 | Syversen |
| 2008/0104046 A1 | 5/2008 | Singla et al. |
| 2008/0127346 A1 | 5/2008 | Oh et al. |
| 2008/0162397 A1 | 7/2008 | Zaltzman |
| 2008/0168559 A1 | 7/2008 | Touitou et al. |
| 2008/0170566 A1 | 7/2008 | Akimoto |
| 2008/0229415 A1 | 9/2008 | Kapoor et al. |
| 2009/0077664 A1 | 3/2009 | Hsu et al. |
| 2009/0089040 A1 | 4/2009 | Monastyrsky et al. |
| 2009/0104046 A1 | 4/2009 | Martin et al. |
| 2009/0158407 A1 | 6/2009 | Nicodemus et al. |
| 2009/0158418 A1 | 6/2009 | Rao et al. |
| 2009/0170566 A1 | 7/2009 | Kwon et al. |
| 2009/0199296 A1 | 8/2009 | Xie et al. |
| 2009/0241173 A1 | 9/2009 | Troyansky |
| 2009/0249466 A1 | 10/2009 | Motil et al. |
| 2009/0249470 A1 | 10/2009 | Litvin et al. |
| 2009/0254973 A1 | 10/2009 | Kwan |
| 2009/0288158 A1 | 11/2009 | Izatt et al. |
| 2009/0296641 A1 | 12/2009 | Bienas et al. |
| 2009/0327688 A1 | 12/2009 | Li et al. |
| 2009/0328196 A1 | 12/2009 | Bovee |
| 2010/0005339 A1 | 1/2010 | Hooks |
| 2010/0077483 A1 | 3/2010 | Stolfo et al. |
| 2010/0122317 A1 | 5/2010 | Yadav |
| 2010/0122343 A1 | 5/2010 | Ghosh et al. |
| 2010/0169973 A1 | 7/2010 | Kim et al. |
| 2010/0269175 A1 | 10/2010 | Stolfo et al. |
| 2010/0293615 A1 | 11/2010 | Ye |
| 2010/0299430 A1 | 11/2010 | Powers et al. |
| 2010/0332498 A1 | 12/2010 | Svore et al. |
| 2011/0023118 A1 | 1/2011 | Wright |
| 2011/0067107 A1 | 3/2011 | Weeks et al. |
| 2011/0078309 A1 | 3/2011 | Bloch et al. |
| 2011/0099633 A1 | 4/2011 | Aziz |
| 2011/0113427 A1 | 5/2011 | Dotan |
| 2011/0138456 A1 | 6/2011 | Ormazabal et al. |
| 2011/0141937 A1 | 6/2011 | Breslin et al. |
| 2011/0145920 A1 | 6/2011 | Mahaffey et al. |
| 2011/0167494 A1 | 7/2011 | Bowen et al. |
| 2011/0178930 A1 | 7/2011 | Scheidt et al. |
| 2011/0185430 A1 | 7/2011 | Sallam |
| 2011/0209219 A1 | 8/2011 | Zeitlin et al. |
| 2011/0214176 A1 | 9/2011 | Burch et al. |
| 2011/0214182 A1 | 9/2011 | Adams et al. |
| 2011/0219443 A1 | 9/2011 | Hampel et al. |
| 2011/0219449 A1 | 9/2011 | St et al. |
| 2011/0225655 A1 | 9/2011 | Niemelä et al. |
| 2011/0247071 A1 | 10/2011 | Hooks et al. |
| 2011/0252434 A1 | 10/2011 | Stokes |
| 2011/0271341 A1 | 11/2011 | Satish et al. |
| 2011/0276597 A1 | 11/2011 | Little |
| 2011/0288940 A1 | 11/2011 | Horadan et al. |
| 2012/0023572 A1 | 1/2012 | Williams et al. |
| 2012/0030745 A1 | 2/2012 | Bauer |
| 2012/0030750 A1 | 2/2012 | Bhargava et al. |
| 2012/0079596 A1 | 3/2012 | Thomas et al. |
| 2012/0084866 A1 | 4/2012 | Stolfo |
| 2012/0106377 A1 | 5/2012 | Sommers et al. |
| 2012/0124363 A1 | 5/2012 | Dietrich et al. |

(56) References Cited

U.S. PATENT DOCUMENTS

| | | |
|---|---|---|
| 2012/0137342 A1 | 5/2012 | Hartrell et al. |
| 2012/0137367 A1 | 5/2012 | Dupont et al. |
| 2012/0144488 A1 | 6/2012 | Sankruthi |
| 2012/0151565 A1 | 6/2012 | Fiterman |
| 2012/0185563 A1 | 7/2012 | Sugiyama et al. |
| 2012/0240182 A1 | 9/2012 | Narayanaswamy et al. |
| 2012/0254995 A1 | 10/2012 | Sallam |
| 2012/0255003 A1 | 10/2012 | Sallam |
| 2012/0255004 A1 | 10/2012 | Sallam |
| 2012/0255012 A1 | 10/2012 | Sallam |
| 2012/0291090 A1 | 11/2012 | Srinivasan et al. |
| 2012/0297486 A1 | 11/2012 | Turbin |
| 2012/0297488 A1 | 11/2012 | Kapoor et al. |
| 2012/0324094 A1 | 12/2012 | Wyatt et al. |
| 2012/0331553 A1 | 12/2012 | Aziz et al. |
| 2013/0052992 A1 | 2/2013 | Lee et al. |
| 2013/0054682 A1 | 2/2013 | Malik et al. |
| 2013/0061097 A1 | 3/2013 | Mendel et al. |
| 2013/0080641 A1 | 3/2013 | Lui et al. |
| 2013/0086684 A1 | 4/2013 | Mohler |
| 2013/0091573 A1 | 4/2013 | Herz et al. |
| 2013/0097706 A1 | 4/2013 | Titonis et al. |
| 2013/0111547 A1 | 5/2013 | Kraemer |
| 2013/0133072 A1 | 5/2013 | Kraitsman et al. |
| 2013/0152200 A1 | 6/2013 | Alme et al. |
| 2013/0167236 A1 | 6/2013 | Sick |
| 2013/0191924 A1 | 7/2013 | Tedesco et al. |
| 2013/0198842 A1 | 8/2013 | Klein et al. |
| 2013/0212658 A1 | 8/2013 | Amaya et al. |
| 2013/0219217 A1 | 8/2013 | Seren et al. |
| 2013/0231084 A1 | 9/2013 | Raleigh |
| 2013/0239192 A1 | 9/2013 | Linga et al. |
| 2013/0242743 A1 | 9/2013 | Thomas et al. |
| 2013/0247190 A1 | 9/2013 | Spurlock |
| 2013/0290662 A1 | 10/2013 | Teal |
| 2013/0290729 A1 | 10/2013 | Pettigrew et al. |
| 2013/0291111 A1 | 10/2013 | Zhou et al. |
| 2013/0298192 A1 | 11/2013 | Kumar et al. |
| 2013/0298244 A1 | 11/2013 | Kumar et al. |
| 2013/0305377 A1 | 11/2013 | Herz |
| 2013/0329732 A1 | 12/2013 | Vyas et al. |
| 2013/0333040 A1 | 12/2013 | Diehl et al. |
| 2013/0340033 A1 | 12/2013 | Jones et al. |
| 2013/0346472 A1 | 12/2013 | Wheeldon |
| 2013/0347052 A1 | 12/2013 | Choudrie |
| 2014/0020046 A1 | 1/2014 | Heitzman |
| 2014/0046645 A1 | 2/2014 | White et al. |
| 2014/0053267 A1 | 2/2014 | Klein et al. |
| 2014/0059525 A1 | 2/2014 | Jawa et al. |
| 2014/0068326 A1 | 3/2014 | Quinn |
| 2014/0068779 A1 | 3/2014 | Tan et al. |
| 2014/0090061 A1* | 3/2014 | Avasarala ............ G06F 21/566 726/24 |
| 2014/0096229 A1 | 4/2014 | Burns et al. |
| 2014/0108794 A1 | 4/2014 | Barton et al. |
| 2014/0114609 A1 | 4/2014 | Maurer et al. |
| 2014/0123280 A1 | 5/2014 | Kedma et al. |
| 2014/0137246 A1 | 5/2014 | Baluda et al. |
| 2014/0150094 A1 | 5/2014 | Rao et al. |
| 2014/0157366 A1 | 6/2014 | Ko et al. |
| 2014/0165203 A1 | 6/2014 | Friedrichs et al. |
| 2014/0215617 A1 | 7/2014 | Smith et al. |
| 2014/0215621 A1 | 7/2014 | Xaypanya et al. |
| 2014/0215625 A1 | 7/2014 | Paul et al. |
| 2014/0237562 A1 | 8/2014 | Nandakumar |
| 2014/0237595 A1 | 8/2014 | Sridhara et al. |
| 2014/0237599 A1* | 8/2014 | Gertner ............... H04L 63/1425 726/24 |
| 2014/0245376 A1 | 8/2014 | Hibbert et al. |
| 2014/0250524 A1 | 9/2014 | Meyers et al. |
| 2014/0259092 A1 | 9/2014 | Boucher et al. |
| 2014/0270157 A1 | 9/2014 | Youd et al. |
| 2014/0280864 A1 | 9/2014 | Yin et al. |
| 2014/0282816 A1 | 9/2014 | Xie et al. |
| 2014/0283038 A1 | 9/2014 | Call et al. |
| 2014/0283076 A1 | 9/2014 | Muttik |
| 2014/0289851 A1 | 9/2014 | Klein et al. |
| 2014/0298419 A1 | 10/2014 | Boubez et al. |
| 2014/0349611 A1 | 11/2014 | Kant et al. |
| 2014/0373091 A1 | 12/2014 | Kirner et al. |
| 2015/0006384 A1 | 1/2015 | Shaikh |
| 2015/0007312 A1 | 1/2015 | Pidathala et al. |
| 2015/0013006 A1 | 1/2015 | Shulman et al. |
| 2015/0013008 A1 | 1/2015 | Lukacs et al. |
| 2015/0033341 A1 | 1/2015 | Schmidtler et al. |
| 2015/0039513 A1 | 2/2015 | Adjaoute |
| 2015/0067763 A1 | 3/2015 | Dalcher et al. |
| 2015/0074810 A1 | 3/2015 | Saher et al. |
| 2015/0082430 A1 | 3/2015 | Sridhara et al. |
| 2015/0089655 A1 | 3/2015 | Choi et al. |
| 2015/0096048 A1 | 4/2015 | Zhang et al. |
| 2015/0113616 A1 | 4/2015 | Sampas |
| 2015/0121524 A1 | 4/2015 | Fawaz et al. |
| 2015/0121529 A1 | 4/2015 | Quinlan et al. |
| 2015/0128206 A1 | 5/2015 | Ben et al. |
| 2015/0128246 A1 | 5/2015 | Feghali et al. |
| 2015/0143496 A1 | 5/2015 | Thomas et al. |
| 2015/0150125 A1 | 5/2015 | Dulkin et al. |
| 2015/0150130 A1 | 5/2015 | Fiala et al. |
| 2015/0156214 A1 | 6/2015 | Kaminsky |
| 2015/0161024 A1 | 6/2015 | Gupta et al. |
| 2015/0161386 A1 | 6/2015 | Gupta et al. |
| 2015/0163121 A1 | 6/2015 | Mahaffey et al. |
| 2015/0172300 A1 | 6/2015 | Cochenour |
| 2015/0195291 A1 | 7/2015 | Zuk et al. |
| 2015/0199512 A1 | 7/2015 | Kim et al. |
| 2015/0200928 A1 | 7/2015 | Burch et al. |
| 2015/0200955 A1 | 7/2015 | Martin |
| 2015/0205962 A1 | 7/2015 | Swidowski et al. |
| 2015/0220735 A1 | 8/2015 | Paithane et al. |
| 2015/0254161 A1 | 9/2015 | Baril et al. |
| 2015/0257194 A1 | 9/2015 | Cho |
| 2015/0264068 A1 | 9/2015 | Beauchesne |
| 2015/0264077 A1 | 9/2015 | Berger et al. |
| 2015/0268947 A1 | 9/2015 | Ionescu |
| 2015/0268989 A1 | 9/2015 | Busch et al. |
| 2015/0271200 A1 | 9/2015 | Brady et al. |
| 2015/0281267 A1 | 10/2015 | Danahy et al. |
| 2015/0286820 A1 | 10/2015 | Sridhara et al. |
| 2015/0288706 A1 | 10/2015 | Marshall |
| 2015/0310196 A1 | 10/2015 | Turgeman et al. |
| 2015/0326587 A1 | 11/2015 | Vissamsetty et al. |
| 2015/0326588 A1 | 11/2015 | Vissamsetty et al. |
| 2015/0326592 A1 | 11/2015 | Mssamsetty et al. |
| 2015/0326599 A1 | 11/2015 | Mssamsetty et al. |
| 2015/0346066 A1 | 12/2015 | Dutta et al. |
| 2015/0350213 A1 | 12/2015 | Varadarajan et al. |
| 2015/0350236 A1 | 12/2015 | Klinghofer et al. |
| 2015/0358345 A1 | 12/2015 | Clark et al. |
| 2015/0370560 A1 | 12/2015 | Tan et al. |
| 2015/0373039 A1 | 12/2015 | Wang |
| 2015/0379371 A1 | 12/2015 | Yoon et al. |
| 2015/0381376 A1 | 12/2015 | Wardman et al. |
| 2016/0028750 A1 | 1/2016 | Di et al. |
| 2016/0042179 A1 | 2/2016 | Weingarten et al. |
| 2016/0042180 A1 | 2/2016 | Sayre et al. |
| 2016/0055334 A1 | 2/2016 | Herwono et al. |
| 2016/0055337 A1 | 2/2016 | El-Moussa |
| 2016/0072838 A1 | 3/2016 | Kolton et al. |
| 2016/0078365 A1 | 3/2016 | Baumard |
| 2016/0080414 A1 | 3/2016 | Kolton et al. |
| 2016/0127352 A1 | 5/2016 | Xu et al. |
| 2016/0127413 A1 | 5/2016 | Kraitsman et al. |
| 2016/0142399 A1 | 5/2016 | Pace et al. |
| 2016/0191554 A1 | 6/2016 | Kaminsky |
| 2016/0212225 A1 | 7/2016 | Smith et al. |
| 2016/0261631 A1 | 9/2016 | Vissamsetty et al. |
| 2016/0285914 A1 | 9/2016 | Singh et al. |
| 2016/0315909 A1 | 10/2016 | Von et al. |
| 2016/0323300 A1 | 11/2016 | Boss et al. |
| 2016/0323316 A1 | 11/2016 | Kolton et al. |
| 2016/0381023 A1 | 12/2016 | Dulce et al. |
| 2017/0009391 A1 | 1/2017 | Fu et al. |
| 2017/0019425 A1 | 1/2017 | Ettema et al. |

(56) References Cited

U.S. PATENT DOCUMENTS

| | | |
|---|---|---|
| 2017/0026387 A1 | 1/2017 | Vissamsetty et al. |
| 2017/0032122 A1 | 2/2017 | Thakar et al. |
| 2017/0054754 A1 | 2/2017 | Saher et al. |
| 2017/0093910 A1 | 3/2017 | Gukal et al. |
| 2017/0126718 A1 | 5/2017 | Baradaran et al. |
| 2017/0134405 A1 | 5/2017 | Ahmadzadeh et al. |
| 2017/0141980 A1 | 5/2017 | Palanciuc et al. |
| 2017/0142068 A1 | 5/2017 | Devarajan et al. |
| 2017/0147796 A1 | 5/2017 | Sardesai et al. |
| 2017/0149787 A1 | 5/2017 | Niemela et al. |
| 2017/0149795 A1 | 5/2017 | Day, II |
| 2017/0149832 A1 | 5/2017 | Touboul et al. |
| 2017/0171244 A1 | 6/2017 | Vissamsetty et al. |
| 2017/0180421 A1 | 6/2017 | Shieh et al. |
| 2017/0201545 A1 | 7/2017 | Nicodemus et al. |
| 2017/0206142 A1 | 7/2017 | Pawar et al. |
| 2017/0206357 A1 | 7/2017 | Gorelik et al. |
| 2017/0230384 A1 | 8/2017 | Touboul et al. |
| 2017/0230402 A1 | 8/2017 | Greenspan et al. |
| 2017/0235967 A1 | 8/2017 | Ray et al. |
| 2017/0244729 A1 | 8/2017 | Fahrny et al. |
| 2017/0244749 A1 | 8/2017 | Shulman et al. |
| 2017/0244755 A1 | 8/2017 | Tsao et al. |
| 2017/0250855 A1 | 8/2017 | Patil et al. |
| 2017/0257375 A1 | 9/2017 | Dulkin et al. |
| 2017/0264639 A1 | 9/2017 | Sama et al. |
| 2017/0279839 A1 | 9/2017 | Vasseur et al. |
| 2017/0279846 A1 | 9/2017 | Osterweil et al. |
| 2017/0286676 A1 | 10/2017 | Weingarten et al. |
| 2017/0302458 A1 | 10/2017 | Berger et al. |
| 2017/0302653 A1 | 10/2017 | Ortner et al. |
| 2017/0302665 A1 | 10/2017 | Zou et al. |
| 2017/0302696 A1 | 10/2017 | Schutz et al. |
| 2017/0318054 A1 | 11/2017 | Vissamsetty et al. |
| 2017/0322959 A1 | 11/2017 | Tidwell et al. |
| 2017/0324774 A1 | 11/2017 | Ohayon et al. |
| 2017/0324777 A1 | 11/2017 | Ohayon et al. |
| 2017/0331849 A1 | 11/2017 | Yu et al. |
| 2017/0331856 A1 | 11/2017 | Vissamsetty et al. |
| 2017/0346802 A1 | 11/2017 | Gruskin et al. |
| 2017/0346853 A1 | 11/2017 | Wyatt et al. |
| 2017/0359370 A1 | 12/2017 | Humphries et al. |
| 2018/0013788 A1 | 1/2018 | Vissamsetty et al. |
| 2018/0020005 A1 | 1/2018 | Beiter et al. |
| 2018/0027006 A1 | 1/2018 | Zimmermann et al. |
| 2018/0027009 A1 | 1/2018 | Santos et al. |
| 2018/0027017 A1 | 1/2018 | Touboul et al. |
| 2018/0039776 A1 | 2/2018 | Loman et al. |
| 2018/0048665 A1 | 2/2018 | Shulman et al. |
| 2018/0063187 A1 | 3/2018 | St Pierre |
| 2018/0089430 A1 | 3/2018 | Mayo |
| 2018/0089431 A1 | 3/2018 | Nalluri et al. |
| 2018/0124096 A1 | 5/2018 | Schwartz et al. |
| 2018/0143915 A1 | 5/2018 | Gonzalez et al. |
| 2018/0146008 A1 | 5/2018 | Vissamsetty et al. |
| 2018/0173876 A1 | 6/2018 | Vissamsetty et al. |
| 2018/0183815 A1 | 6/2018 | Enfinger |
| 2018/0191593 A1 | 7/2018 | De et al. |
| 2018/0225592 A1 | 8/2018 | Ponnuswamy |
| 2018/0248896 A1 | 8/2018 | Challita et al. |
| 2018/0359272 A1 | 12/2018 | Mizrachi et al. |
| 2018/0359278 A1 | 12/2018 | Rusakov et al. |
| 2019/0042745 A1 | 2/2019 | Chen et al. |
| 2019/0052659 A1 | 2/2019 | Weingarten et al. |
| 2019/0068642 A1 | 2/2019 | Araujo et al. |
| 2019/0073475 A1 | 3/2019 | Gupta et al. |
| 2019/0114426 A1 | 4/2019 | Cohen et al. |
| 2019/0138639 A1 | 5/2019 | Pal et al. |
| 2019/0138725 A1 | 5/2019 | Gupta |
| 2019/0199736 A1 | 6/2019 | Howard et al. |
| 2019/0253453 A1 | 8/2019 | Vissamsetty et al. |
| 2019/0258807 A1 | 8/2019 | Dimaggio et al. |
| 2019/0294485 A1 | 9/2019 | Kukreja et al. |
| 2019/0294614 A1 | 9/2019 | Brodt et al. |
| 2019/0318100 A1 | 10/2019 | Bhatia et al. |
| 2019/0340353 A1 | 11/2019 | Mitelman |
| 2019/0349369 A1 | 11/2019 | Bengtson et al. |
| 2019/0354355 A1 | 11/2019 | Jacobson et al. |
| 2019/0379697 A1 | 12/2019 | Vissamsetty et al. |
| 2019/0392260 A1 | 12/2019 | Pang et al. |
| 2020/0050586 A1 | 2/2020 | Pal et al. |
| 2020/0051697 A1 | 2/2020 | Krishnamurti et al. |
| 2020/0076853 A1 | 3/2020 | Pandian et al. |
| 2020/0133865 A1 | 4/2020 | Mannava et al. |
| 2020/0143054 A1 | 5/2020 | Cohen et al. |
| 2020/0143061 A1 | 5/2020 | Kim et al. |
| 2020/0201620 A1 | 6/2020 | Beard |
| 2020/0218806 A1 | 7/2020 | Cho |
| 2020/0244677 A1 | 7/2020 | Abbaszadeh et al. |
| 2020/0252429 A1 | 8/2020 | Vissamsetty et al. |
| 2020/0274894 A1 | 8/2020 | Argoeti et al. |
| 2020/0374087 A1 | 11/2020 | Vissamsetty et al. |
| 2021/0029153 A1 | 1/2021 | Sugimoto et al. |
| 2021/0073374 A1 | 3/2021 | Mookken et al. |
| 2021/0073658 A1 | 3/2021 | Poole et al. |
| 2021/0117232 A1 | 4/2021 | Sriharsha et al. |
| 2021/0232291 A1 | 7/2021 | Abdulaal et al. |
| 2021/0263945 A1 | 8/2021 | Siebel et al. |
| 2021/0397710 A1 | 12/2021 | Cohen et al. |
| 2022/0050895 A1 | 2/2022 | Yu et al. |
| 2022/0070256 A1 | 3/2022 | Singh et al. |
| 2022/0086142 A1 | 3/2022 | Hecht |
| 2022/0101096 A1 | 3/2022 | Singer et al. |
| 2022/0164444 A1 | 5/2022 | Prudkovskij |
| 2022/0210200 A1* | 6/2022 | Crabtree ............... G06F 16/951 |
| 2022/0253526 A1 | 8/2022 | Sanders |
| 2022/0391496 A9 | 12/2022 | Salem et al. |
| 2023/0007025 A1 | 1/2023 | Weingarten et al. |
| 2023/0007026 A1 | 1/2023 | Weingarten et al. |
| 2023/0007027 A1 | 1/2023 | Weingarten et al. |
| 2023/0007028 A1 | 1/2023 | Weingarten et al. |
| 2023/0007029 A1 | 1/2023 | Weingarten et al. |
| 2023/0007030 A1 | 1/2023 | Weingarten et al. |
| 2023/0007031 A1 | 1/2023 | Weingarten et al. |
| 2023/0247046 A1 | 8/2023 | Peters et al. |
| 2023/0319089 A1 | 10/2023 | Chesla et al. |

FOREIGN PATENT DOCUMENTS

| | | |
|---|---|---|
| CN | 113297584 A | 8/2021 |
| CN | 113434858 A | 9/2021 |
| EP | 3171568 A1 | 5/2017 |
| EP | 3472746 A1 | 4/2019 |
| EP | 3968197 A1 | 3/2022 |
| ES | 2785350 T3 | 10/2020 |
| JP | 2006-106939 A | 4/2006 |
| JP | 2008-252625 A | 10/2008 |
| JP | 2013-168141 A | 8/2013 |
| JP | 2015-534690 A | 12/2015 |
| JP | 2016-512631 A | 4/2016 |
| JP | 2017-504102 A | 2/2017 |
| KR | 10-2015-0101811 A | 9/2015 |
| KR | 10-1969572 B1 | 4/2019 |
| KR | 10-2021-0079494 A | 6/2021 |
| WO | 02/27440 A2 | 4/2002 |
| WO | 2010/030169 A2 | 3/2010 |
| WO | 2012/027669 A1 | 3/2012 |
| WO | 2013/014672 | 1/2013 |
| WO | 2013/121951 A1 | 8/2013 |
| WO | 2014/126779 A1 | 8/2014 |
| WO | 2015/171780 A1 | 11/2015 |
| WO | 2015/171789 A1 | 11/2015 |
| WO | 2016/024268 A1 | 2/2016 |
| WO | 2016/081561 A1 | 5/2016 |
| WO | 2017/064710 A1 | 4/2017 |
| WO | 2017/068889 A1 | 4/2017 |
| WO | 2017/218872 A1 | 12/2017 |
| WO | 2019/032728 A1 | 2/2019 |
| WO | 2019/092530 A1 | 5/2019 |
| WO | 2019/245107 A1 | 12/2019 |

(56) References Cited

FOREIGN PATENT DOCUMENTS

| WO | 2020/108357 A1 | 6/2020 |
| WO | 2022/076234 A1 | 4/2022 |

OTHER PUBLICATIONS

IBM Security Guardium Insights for IBM Cloud Park for Security, printed from https://www.ibm.com/downloads/cas/QY1RYRLP, printed May 26, 2021 in 12 pages.

"IBM Security Qradar SIEM Installation Guide" downloaded from http://www.siem.su/docs/ibm/Installation_andupdating/IBM_SecurityQRadar installation_Guide.pdf, printed 2013, vol. 7.2 in 54 pages.

"IBM Security Trusteer Apex Advanced malware Protection (SaaS) delivers an enterprise endpoint security solution to help protect organizations from advanced malware and targeted attacks" downloaded from https://www-01.ibm.com/common/ssi/rep_ca/0/877/ENUSZP14-0390/ENUSZP14- 0390.PDF, printed Aug. 5, 2014, in 9 pgs.

AbdelHameed, M.U, et al. Portable executable automatic protection using dynamic infection and code redirection; 2009 International Conference on Computer Engineering & Systems (pp. 501-507); (Year: 2009).

Abrath, Bert et al. Obfuscating Windows DLLs; 2015 IEEE/ACM 1st International Workshop on Software Protection (pp. 24-30); (Year: 2015).

Barbhuiya et al., "Detection of neighbor solicitation and advertisement spoofing in IPV6 neighbor discovery protocol." Proceedings of the 4th international conference on Security of information and networks. (2011).

Birrer, B, et al., "Using qualia and hierarchical models in malware detection", Journal of Information Assurance and Security, Dec. 29, 2009, pp. 247-255.

Chakraborty et al., "Hierarchical learning for automated malware classification", MILCOM 2017-2017 IEEE Military Communications Conference (MILCOM), Oct. 23-25, 2017, pp. 1-6.

Chen et al., "MitM attack by name collision: Cause analysis and vulnerability assessment in the new gTLD era." Security and Privacy (SP), 2016 IEEE Symposium on. IEEE (2016).

Dini et al., "Probabilistic Contract Compliance for Mobile Applications", Eighth International Conference on Availability, Reliability and Security (ARES) IEEE, Sep. 2-6, 2013, pp. 599-606.

Gu et al., "Malicious Shellcode Detection with Virtual Memory Snapshots," 2010 Proceedings IEEE INFOCOM, San Diego, CA, 2010, pp. 1-9, accessed Mar. 6, 2019.

IBM Guardium Documentation "Components and Topology", downloaded from https://www.IBM.com/docs/en/qsip/7.4?topic=deployment-qradar-architecture-overview, printed on Jun. 8, 2021, in 3 pages.

IBM Security Qradar Solution Brief "Visibility, detection, investigation and response" printed from https://www.ibm.com/downloads/cas/OP62GKAR, printed on May 26, 2021, in 11 pgs.

IBM Software, "Stepping up the battle against advanced threats", IBM Trusteer Apex Thought Leadership White Paper, Dec. 2013, WGW03043-USEN-OO.

IBM, "Qradar Architecture overview", downloaded from https://www.ibm.com/docs/en/qsip/7.4?topic=deployment-qradar-architecture-overview printed May 28, 2021, in 6 DQS.

Installing a Tanium Client—distributed also using user/password (not encrypted) from a hosted Module server, downloaded from https://docs.tanium.com/client/client/deployment.html#client_management on Apr. 2021.

Jack Ullrich, Detecting Manual Syscalls from User Mode, Winternl, Cybersecurity Research & Development, Feb. 10, 2021, 11 pages, https://winternl.com/detecting-manual-syscalls-from-user-mode/.

Laureano et al., M., "Intrusion detection in virtual machine environments. In Euromicro Conference, 2004. Proceedings." 30th (pp. 520-525). IEEE Sep. 30, 2004.

Liu et al., "Detecting Trojan Horses Based on System Behavior Using Machine Learning Method", International Conference on Machine Learning and Cybernetics (ICMLC), IEEE, Jul. 11-14, 2010, 02:S. 855-860.

Mahler, "A New Methodology for Information Security Risk Assessment for Medical Devices and Its Evaluation," 2020, The Department of Software and Information Systems Engineering, Ben-Gurion University of the Negev, Israel.

Matsuda, Wataru et al. "Real-Time Detection System Against Malicious Tools by Monitoring DLL on Client Computers;" 2019 IEEE Conference on Application, Information and Network Security (AINS) (pp. 36-41); (Year: 2019).

Moussaileb et al., "Ransomware's Early Mitigation Mechanisms," Proceedings ARES 2018 Proceedings of the 13th International Conference on Availability, Reliability and Security Article No. 2, 02:S 1-10 (2018).

Nisslmueller, U., "LOLBin detection through unsupervised learning An approach based on explicit featurization of the command line and parent-child relationships", University of Twente, Student Theses, Sep. 27, 2022, 72 pages.

Ornaghi et al., "Man in the middle attacks." Blackhat Conference Europe (2003).

Pandian, "Security Challenges of IoT and Medical Devices in Healthcare," Internet of Things, 1st Edition, 2020, Chapter 6, pp. 87-106.

Ramachandran et al., "Detecting ARP spoofing: An active technique." International Conference on Information Systems Security, Springer, Berlin, Heidelberg (2005).

Reaqta Hive, A.I. Based Endpoint Threat Response, Whitepaper, 27 pages (Apr. 6, 2017).

Schollmeier, "A Definition of Peer-to-Peer Networking for the Classification of Peer-to-Peer Architectures and Applications," Proceedings of the First International Conference on Peer-to-Peer Computing, IEEE (2002).

Shosha et al., A.F., "Evasion-resistant malware signature based on profiling kernel data structure objects." In 2012 7th International Conference on Risks and Security of Internet and Systems (CRISIS) (pp. 1-8). IEEE., Oct. 31, 2012.

Shun-Wen Hsiao et al., "Sequence Feature Extraction for Malware Family Analysis via Graph Neural," Network, arXiv:2208.05476v1, Aug. 10, 2022, pp. 1-12.

Stine, "A cyber risk scoring system for medical devices," International Journal of Critical Infrastructure Protection, Dec. 2017, vol. 19, pp. 32-46.

Tanium™ Client Management 1.6 User Guide, downloaded from https://docs.tanium.com/client_management/client_management/index.html on Apr. 1, 2021.

Ullrich et al., "IPv6 Security: Attacks and Countermeasures in a Nutshell." 8th USENIX Workshop on Offensive Technologies (2015).

Xu et al., "Polymorphic Malicious Executable Scanner by API Sequence Analysis", Fourth International Conference on Hybrid Intelligent Systems, IEEE Dec. 5-8, 2004, pp. 378-383.

Zaldivar, "Investigating the Security Threats on Networked Medical Devices," 2020, 10th Annual Computing and Communication Workshop and Conference, Jan. 2020.

* cited by examiner

CLASSIFYING CYBERSECURITY THREATS USING MACHINE LEARNING ON NON-EUCLIDEAN DATA

CROSS-REFERENCE TO RELATED APPLICATIONS

This application claims the benefit of U.S. Provisional Patent Application No. 63/479,956, entitled "SYSTEMS, METHODS, AND DEVICES FOR CLASSIFYING THREATS USING MACHINE LEARNING," filed Jan. 13, 2023, the contents of which are incorporated by reference herein in their entirety.

Any and all applications for which a foreign or domestic priority claim is identified in the Application Data Sheet as filed with the present application are hereby incorporated by reference under 37 CFR 1.57.

TECHNICAL FIELD

The embodiments herein are generally related to the field of detection of malicious software (malware), and more specifically, to the use of machine learning models in the context of behavior-based malware detection for identifying and classifying threats to computer and network systems.

BACKGROUND

With the rapid growth of computer technology and widespread Internet access, malware threats have continued to grow significantly in recent decades, and thus have caused severe damage to systems, such as hardware failures and loss of critical data, etc.

Various antivirus technologies are currently in use, including signature and behavior based analysis, which aim to identify and prevent further spread of malware in the network. Signature-based analysis involves searching for known patterns of malicious code within executable code. However, malware is often modified (e.g., by obfuscating and randomizing content) in order to change its signature without affecting functionality, which renders the signature-based analysis mechanism as being increasingly ineffective. Due to an increase in malware variants (e.g., malware variants with the same behavior but different signatures), behavior-based analysis may be used to identify malware variants that have similar effects and thus can be handled with similar security measures.

Behavior-based analysis detects malware by monitoring behaviors of malicious activities rather than static signatures. Existing behavioral monitoring systems include a database of actions that are blacklisted and indicate malicious intent. If a given process or program performs any of the actions listed in the database, the action is blocked, and the process may be identified as malicious, and thus be terminated, by the monitoring system.

Behavior-based security is a proactive approach to security in which all relevant activity is monitored so that deviations from normal behavior patterns can be identified and dealt with quickly. Traditional security software is signature-oriented, such that the software monitors data streams and compares data in transit to signatures in an anti-virus vendor's library of known threats. Behavior-based security programs, on the other hand, monitor data streams and compare data stream activity to a baseline of normal behavior to identify anomalies. In general, signature-based tools are best at identifying and repelling known threats, while behavior-based are best for fighting zero-day exploits that have not yet made it onto a list of known threat signatures. Most behavior-based security programs come with a standard set of policies for which behaviors should be allowed and which should be considered suspicious, but also allow administrators to customize policies and create new policies. As such, unlike for signature-oriented programs, there is no particular indicator of compromise or piece of information that can be identified in behavior-based systems.

This means that identification and classification of threats using behavior-based systems takes additional time and resources. For instance, there can be much time spent behind the scenes (e.g., outside of real-time monitoring and detection) in investigating different behavior patterns to define which behaviors are suspicious in the standard set of policies. Furthermore, the criteria used by behavior-based systems to catch suspicious behaviors may also change and evolve over time as malware adapts and exploits change.

It would be a good use of machine learning to automate these tasks and to train a machine learning model on suspicious behavior patterns. The model could be updated to learn new suspicious behavior patterns as they change over time. It could also be applied in real-time for behavior-based analysis to detect suspicious behaviors and identify/classify threats. However, traditional machine learning techniques are not well-suited for handling data that is non-Euclidean in nature (e.g., is not easily captured by a grid-like arrangement). Data associated with the actions and behaviors initiated by malware, which may contain complex relationships and sequencing, may be of this nature. It is not easy or straightforward to adapt the use of machine learning to such data, and vice versa.

Accordingly, there is a need in the art for new systems, methods, and devices in behavior-based cybersecurity that can employ machine learning approaches with a better understanding of the complex relationships and sequencing associated with behavior-based data, and that can effectively apply machine learning for behavior-based analysis, malware detection, and identifying and classifying threats in real-time.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the embodiments described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

The embodiments of the disclosure are directed to systems, methods, and devices in behavior-based cybersecurity that can employ machine learning approaches with a better understanding of the complex relationships and sequencing associated with behavior-based data, and that can effectively apply machine learning for behavior-based analysis, malware detection, and identifying and classifying threats in real-time.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
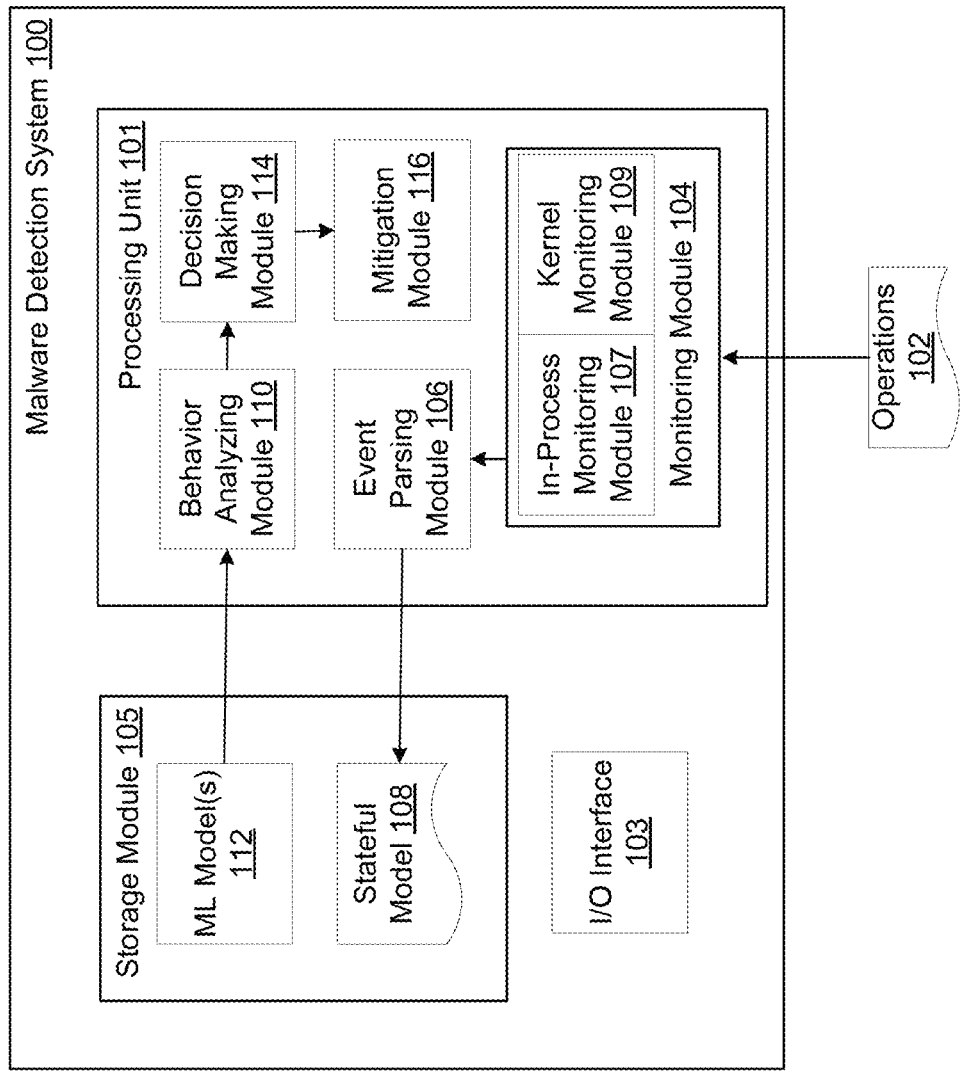
FIG. 1 a functional block diagram illustrating a malware detection system, in accordance with embodiments of the present disclosure.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Thus, the scope of the claims is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present technology.

Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

As used herein, the term malware may include, for example and without limitation, any type of malicious software and/or files that include malicious software. Malicious software can include, for example and without limitation any software or code designed to disrupt the operation of a computer system, network, etc., and/or to gain unauthorized access to a computer system, network, etc. Malware can include, for example and without limitation, computer viruses, worms, trojans, ransomware, rootkits, dialers, spyware, adware, wipers, keyloggers, malicious browser helper objects (BHOs), rogue security software (e.g., software designed to mislead users into believing other malware is present on their computers), and so forth.

As used herein, the terms stateful model, storyline, or endpoint model may include a logical structure representation of a sequence of linked operations performed in a live environment and the objects associated with those linked operations. An overview of stateful models and their generation is provided herein. However, additional discussion of this process is helpful and is provided in U.S. Pat. No. 9,710,648, filed under U.S. application Ser. No. 14/456,127, entitled "METHOD OF MALWARE DETECTION AND SYSTEM THEREOF," which is hereby incorporated by reference in its entirety.

It should be noted that, for ease of facilitating understanding, many of the steps and processes described herein are within the context of processing a single stateful model on an endpoint and applying machine learning models for real-time threat classification and malware detection. However, a person skilled in the art will recognize that these steps can also be adapted and used for training machine learning models and/or processing training data to train those models. For example, a large amount of training data (e.g., associated with many observed stateful models) can be collected and similarly processed to train different models for feature extraction, transforming embeddings, and/or performing predictive tasks on graphs. In some embodiments, the training data may include labels (e.g., classifications for the various stateful models). In some embodiments, the training data may not be labeled (e.g., for pretraining a transformer model).

There are many different kinds of machine learning models and approaches that exist. In the realm of traditional machine learning, supervised learning paradigms like decision trees, support vector machines, Bayesian networks, and regression analysis are widely used for simple predictive tasks. For more complex machine learning tasks, like object detection, machine translation, and speech recognition, feature learning techniques like artificial neural networks (e.g., CNNs, RNNs, autoencoders) can be used to automatically extract features from raw input data.

However, while these aforementioned approaches are good at capturing hidden patterns in well-structured data, such as Euclidean data that can fit into a grid-like structure (e.g., data in tabular, text, image, or video format), there are many applications where data is generated from non-Euclidean domains, with complex relationships and interdependencies between objects. Traditional machine learning approaches are not well suited to handling data with relationships and understanding the relationships between objects. It is not immediately clear how relationships should be encoded in the input data and it can be unwieldy to work with. Unfortunately, there are often many cases in which real-world objects, entities, and events are defined in terms of their relationships (e.g., connections, links, or associations) to other objects, entities, or events. Some common types of relationships include dependency relationships (e.g., parent-child), grouping relationships (e.g., sets and subsets), and ordering relationships (e.g., sequencing or chronology).

As previously alluded to, one such case is behavior-based analysis in the cybersecurity context to detect malware by monitoring behaviors of malicious activities rather than static signatures. There exists heuristics-based engines that can monitor activity on an endpoint and utilize contextual information to detect malicious or anomalous behavior. For example, a system may monitor the operations that occur on an endpoint, which may include the processes, files, threads, and events that are initiated or modified by a threat (e.g., malware) executing on the endpoint. In some embodiments, the system may automatically correlate all related objects (processes, files, threads) and events associated with the threat, generating data that can be collected and analyzed to detect and identify the threat in real-time.

However, use of machine learning may be advantageous for behavior-based analysis because it may allow new instances of malware, which frequently change behaviors, to be detected faster. Unfortunately, the collected endpoint data may contain various relationships that can be relevant to detecting and identifying the threat, such as the source object associated with a particular operation, the target object associated with a particular operation, the sequence of operations, and so forth. In order for a machine learning model to better detect and identify threats, it needs to be able to properly model, understand, and utilize these relationships in the data. For example, there may be a sequence of events, and each event, when considered independently, may not be identifiable as malicious, but when considered within the context of the other events, it becomes clear that the entire sequence of events is actually performing a malicious action. Accordingly, there is an issue of how to properly adapt a machine learning model for behavior-based analysis on data collected from monitoring operations on an endpoint (which contains complex relationships, e.g., non-Euclidean data), and vice versa, to enable the model to better detect suspicious behavior and identify threats.

One workaround, which is described herein, is to directly transform that data into a Euclidean input as required by existing techniques. For example, the data can be transformed into tabular data format. This approach is described in connection with FIG. 10. However, this approach may not capture all the complex relationships that exist in the data.

The other approaches described herein involve machine learning techniques that directly process the non-Euclidean structured data as input, so that any useful information derived from the relationships and interdependencies between objects is not lost in transforming the data. More specifically, the sequence of operations and collected endpoint data may first be modeled using a graph data structure (e.g., comprising nodes and edges). The use of a graph in this manner is described in connection with FIGS. 2A, 2B, and 3.

In one approach, graph neural networks (GNNs) can be used to learn about the structure and sequence of the graph components. GNNs are a class of deep learning methods designed to perform inference on data described by a graph data structure to perform node-level, edge-level, and graph-level prediction tasks. GNNs can model relations between objects in both the spatial and temporal domains, which is essential for learning discriminative features for detection and data association. This approach is described in connection with FIGS. 4-6.

In another approach, transformers can be used to learn about the structure and sequence of the graph components. Transformers are a class of deep learning methods based on an attention mechanism that can learn context by tracking relationships in sequential data. Although they have generally been associated with natural language processing (e.g., to learn words in a sentence), they can be adapted for use with data described by a graph data structure to perform predictive tasks. This approach is described in connection with FIGS. 7-9.

FIG. 1 illustrates a malware detection system 100 that can utilize machine learning to classify threats, in accordance with embodiments of the present disclosure.

In some embodiments, the malware detection system 100 illustrated in FIG. 1 implements a computer-based malware detection mechanism, which enables end users to detect malware in real time in a live environment. The term "live environment" used in this specification should be expansively construed to include any kind of host machine configuration where computer programs and products are actually put into operation for their intended uses by end users, such as, for example, an end user station with programs concurrently running in a production environment, in contrast to a safe environment, such as, for example, an emulated environment, or a sandboxed virtual machine environment.

As shown, the malware detection system 100 includes at least one processing unit 101. In some embodiments, the processing unit 101 may comprise one or more of the following functional modules: monitoring module 104, event parsing module 106, behavior analyzing module 110, and decision making module 114. Alternatively the processing unit 101 can be operatively coupled to the functional modules, and configured to receive instructions therefrom and execute operations in accordance with the instructions.

In some embodiments, the monitoring module 104 can be configured to monitor, in real time, one or more operations 102 of at least one computer program that runs concurrently in the live environment. It is to be noted that the term "operation" used in this specification should be expansively construed to include any kinds of actions performed by one or more processes, threads, applications, files or any other suitable entities in any operating system. By way of non-limiting example, in a Windows operating system, operations can be performed by one or more processes of the computer programs. For purpose of illustration only, references are made in part of the following description with respect to operations performed by one or more processes. Embodiments are, likewise, applicable to operations performed by any other suitable entities in any operating system as described above.

A process is an instance of a computer program that is being executed. A process can further create child processes, and a computer program can be associated with one or more processes. It should be noted that the term "program" used in this specification should be expansively construed to include any kind of system software (e.g., operating system, device drivers, etc.) and application software (e.g., office suites, media players, etc.) that perform specified tasks with a computer.

As aforementioned, monitoring module 104 can monitor all the operations (e.g., performed by processes or other entities) occurred in the live system environment. According to certain embodiments, the monitoring module 104 can further include two sub-components: an in-process monitoring module 107 and a kernel monitoring module 109. The in-process monitoring module 107 can monitor all in-process operations that are performed at process level and do not necessarily involve the kernel of an operating system. The kernel monitoring module 109 can monitor all operations that request services from an operating system's kernel, such as file system operations, process and memory operations, registry operations, and network operations, and so forth.

It is to be further noted that, without limiting the scope of the disclosure in any way, in some cases one operation can be construed to include a single action, such as "file read". In some other cases, one operation can also be construed to include a sequence of actions, for example, "file copy" can be regarded as one operation which includes a sequence of three sequential actions "file create", "file read", and "file write".

In some embodiments, the event parsing module 106 can be configured to build at least one stateful model 108 in accordance with the one or more operations that are monitored by the monitoring module 104. According to certain embodiments, a stateful model 108 is a data model with hierarchical structure that contains information indicative of a real time updated system state resulted from a sequence of operations performed in a live environment. The sequence of operations can be linked together by context. Thus the stateful model 108 can be a logical representation (e.g., a tree structure, etc) of a sequence of linked operations. For instance, the stateful model 108 can include one or more objects derived from real time operations 102, and one or more relationships identified among the objects in accordance with the operations. According to certain embodiments, each of the objects of the stateful model 108 can represent an entity related in the operations and can be of a type selected from a group that includes: process object, file object, network object, registry object and windows object. The stateful model 108 can further include attributes characterizing the objects and the identified relationships therein, as further elaborated with respect to FIG. 3. As used in this specification, the term "storyline" may be used synonymously with a stateful model or it may refer to a graphical representation of a stateful model (e.g., displayed on a graphical user interface).

In some embodiments, the stateful model 108 that is built by the event parsing module 106 can also be stored in the storage module 105. In some embodiments, the stateful model 108 may be saved and/or provided to a centralized location (e.g., a server, the cloud, etc.) to serve as additional training data for training and improving the ML model(s) 112.

In some embodiments, the behavior analyzing module 110 can be configured to analyze the stateful model 108 constructed by event parsing module 106 to identify one or more behaviors. It should be noted that the term "behavior" used in this specification should be expansively construed to include any sequence of operations performed by one or more processes that may fit one or more behavioral patterns.

According to certain embodiments, the malware detection system 100 can further comprise a storage module 105 that comprises a non-transitory computer readable storage medium. The storage module 105 can include one or more ML model(s) 112 that are operatively coupled to the behavior analyzing module 110 and are trained and configured to classify behaviors according to specific behavioral patterns.

In some cases, the ML model(s) 112 may be trained and configured using training data, such as stateful models or storyline data, collected from the historical monitoring of real time operations exhibiting behaviors under different scenarios. There may be prior knowledge of the types of behaviors exhibited in the stateful models or storyline data, including behaviors identified to be associated with malware (e.g., based on prior knowledge of certain malware behaviors, such as, for instance, self-deletion, self-execution, and code injection, etc.) or behaviors that are known to be benign behaviors. Accordingly, the ML model(s) 112 may be trained to recognize these specifical behavioral patterns and then identify these different types of behaviors in stateful models or storyline data.

In some embodiments, the malware detection system 100 is not directly involved in the training of the ML model(s) 112; the ML model(s) 112 may be trained separately from the malware detection system 100 in order to maintain a lightweight footprint on the malware detection system 100. Instead, the pretrained ML model(s) 112 may be made accessible to the malware detection system 100 (e.g., saved onto the storage module 105), so that the malware detection system 100 can apply the ML model(s) 112 in real time.

In some embodiments, the decision making module 114 may be configured to determine the presence of malware based on the one or more behaviors identified by the behavior analyzing module 110. In some embodiments, the decision making module 114 may take into account various factors to determine if malware is present, including the analysis provided by the behavior analyzing module 110. For example, the behavior analyzing module 110 may apply the ML model(s) 112 to classify a behavior exhibited in the stateful model 108 or collected storyline data as being associated with malware, and the decision making module 114 may be able to look at the scores (e.g., probabilities, confidence levels) associated with that classification as part of its determination whether malware is present.

According to certain embodiments, the processing unit 101 can further include a mitigation module 116 configured to eliminate the determined malware by remediating the one or more operations indicated by the stateful model 108.

According to further embodiments, the malware detection system 100 can further include an I/O interface 103 communicatively coupled to the processing unit 101. In some embodiments, the I/O interface 103 can be configured to perform the following actions: receive instructions from end users and/or from one or more of the functional modules, and provide an output of processed information obtained from the functional modules, e.g., an illustration of the determined malware, to the end users.

According to certain embodiments, the processing unit 101 is further configured to perform at least one of the aforementioned operations of the functional components of the malware detection system 100 in real time.

It should be further noted that the aforementioned functional components of the malware detection system 100 can be implemented in a stand-alone endpoint or computer, such as the end user station. Or alternatively, one or more of the functional components can be distributed over several computers in different locations. In addition, the above referred modules can, in some cases, be cloud based.

Those versed in the art will readily appreciate that the teachings of the presently disclosed subject matter are not bound by the system illustrated in FIG. 1. Alternative to the example shown in FIG. 1, the malware detection system 100 can, in some cases, include fewer, more and/or different modules than shown in FIG. 1. Equivalent and/or modified functionality can be consolidated or divided in another manner and can be implemented in any appropriate combination of software, firmware and hardware.

One or more operations of at least one program that runs in a live environment can be monitored in real time, e.g., by the monitoring module 104 of the malware detection system 100. As aforementioned, in contrast to a safe environment, a live environment should include one or more computer programs that are put into operation for their intended uses. The computer programs run concurrently and interactively (e.g., with other programs and/or end users) in the live environment. According to certain embodiments, one or more processes can be launched by the one or more programs. Each process can perform one or more operations in order to communicate with and/or request services from the operating system. Accordingly, the monitoring module 104 can be configured to monitor the one or more operations performed by each process.

Due to the large number of concurrently running programs and operations thereof in a live environment, the amount of information contained in the monitored operations can be huge. According to certain embodiments, the monitoring module 104 can be configured to select at least one operation of interest from the one or more operations, and monitor the selected at least one operation of interest.

According to certain embodiments, the at least one operation of interest includes one or more in-process operations and/or one or more kernel related operations. In-process operations can include any operation performed in user space (i.e., the memory area where application software executes) and do not necessarily involve the kernel of an operating system, such as, by way of non-limiting example, local process memory allocation, mapping functions from imported libraries, and read/write process memory. In some cases, the in-process operations can be monitored (e.g., by the in-process monitoring module 107) by intercepting one or more library calls (e.g., API calls) that represent the corresponding operations. By way of non-limiting example, the in-process monitoring module 107 can attach monitoring hooks to the library calls in user space in order to monitor these calls.

The kernel related operations, on the other hand, can include one or more of the following operations that are performed in kernel space (i.e., the memory area reserved for running privileged kernel, kernel extensions, and most device drivers): file system operations, process and memory operations, registry operations, and network operations. Specifically, by way of non-limiting example, file system operations can include any operation and interaction with the storage medium of the host machine. Process and memory operations can include any operation of creating, terminating, modifying, querying, suspending and resuming processes, as well as memory management (e.g., allocating memory, creating a memory section, mapping/unmapping a memory section, writing/reading memory, etc). Registry operations can include any operation related to registry manipulation. Network operations can include any operation of sending or receiving data through network and network connection management.

The kernel related operations can be monitored by the kernel monitoring module 109 through different mechanisms, e.g., in accordance with different operating system platforms. For instance, for Mac OS X operating system, the kernel related operations can be monitored, by way of non-limiting example, by intercepting one or more system calls (in kernel space) that represent the corresponding operations. For the Windows operating system, kernel related operations can be monitored, by way of non-limiting example, by registering one or more kernel filter drivers for the kernel related operations via one or more callback functions. Windows operating system allows new drivers to be registered as part of the existing kernel stack, and thus information regarding a specific type of operation can be filtered by a corresponding kernel filter driver and passed through to the Kernel Monitoring Module via callback functions.

According to certain embodiments, OOB (Out-of-Band) monitoring approach can be adapted in the monitoring process (e.g., by the kernel monitoring module 109). OOB enables the monitoring module to get notified on selected operations/events while not to have control over these operations/events, which allows the monitoring module to utilize different monitoring mechanisms (e.g., kernel callback functions) to accomplish a full system monitoring in an optimized manner OOB also allows the events to be processed and analyzed into a stateful model in real time while the events are happening, as further described below.

According to certain embodiments, OOB can also enable the sequence of operations described herein, e.g., the monitoring operations, building stateful models, analyzing behaviors by applying ML models, determining if malware present, and eliminating the determined malware, to be performed in the same machine, such as an end user station.

It is to be noted that the aforementioned categorized operations that are monitored respectively by different monitoring modules are provided for exemplary purposes only and should not be construed as limiting. For instance, in some cases one or more of the operations monitored by the in-process monitoring module 107 can also be monitored by the kernel monitoring module 109, and vice versa. According to one embodiment, at least one of the kernel related operations can be only monitored by the kernel monitoring module 109.

It should be noted that above mentioned examples of operations and implementations of the monitoring mechanisms are illustrated for exemplary purposes only. Additional kinds of operations and implementations can be applied in addition to or instead of the above.

It is also noted that the implementation mechanisms of the kernel monitoring module 109 can expedite system processing and enable the monitoring of the operations to be performed in a real time manner in a live environment.

According to certain embodiments, each monitored operation of the one or more operations constitutes an event. The monitoring module 104 can be further configured to generate event data characterizing one or more events. Optionally, an event data can be generated to characterize a respective event. According to certain embodiments, the event data can include at least the following attributes of the respective event: operation type, and source of the event.

Specifically, operation type is an identifier indicative of the type of the monitored operation that constitutes the event. The source of an event is the originating entity that performs the operation. Optionally, event data can include one or more additional attributes. For example, in some cases event data can include a target of an event, such as a targeting process, a targeting file, or any other entities that the operation is performed upon by the source of the event. In some further cases, event data can also include additional attributes according to different types of operations. For instance, event data that characterize file system operations can include additional attributes such as file permissions, full path of the file, size of the file, etc, while event data that characterize process and memory operations can include additional attributes such as address of the memory on which the operation is performed, size of the data that was written or read, memory permissions, etc.

According to certain embodiments, the event data generated by the monitoring module 104 is created based on a large amount of raw data gathered through different routes, e.g., low level system calls and kernel driver callbacks, etc, thus the event data are generated in various forms. According to certain embodiments, this raw form of event data can be normalized by the event parsing module 106 into a logical data structure, giving rise to an abstract event which allows each segment of the attributes encoded in the event data to be accessed and analyzed. Specifically, the event parsing module 106 can format the event data and parse the formatted event data in order to generate the abstract event. Through the event data normalization, event data indicative of similar operations but generated in various forms can also be normalized into a single format and categorized into the same event type. For example, various system API calls generated to allocate memory will be categorized into a single type of abstract event, e.g., a memory allocation event.

According to certain embodiments, the event parsing module 106 can select event data associated with events of interest from all event data received from the monitoring module 104 based on one or more predefined filtering rules, and apply the normalization with respect to the selected event data. By way of non-limiting example, the one or more predefined filtering rules can include filtering out event data associated with the following events: uncompleted events, memory related events in which the targeting process is not a remote process, and events in which the targeting process does not exist.

Based on the generated abstract event, a stateful model 108 can be created or updated. As aforementioned, a stateful model can be a logical structure representation of a sequence of linked operations performed in a live environment. At least one stateful model 108 can be built in accordance with the one or more operations described herein, e.g., by the event parsing module 106 of the malware detection system 100.

According to certain embodiments, for each event data that is normalized to an abstract event, one or more objects can be retrieved from the abstract event. As aforementioned, each of the retrieved objects represents an entity related in a corresponding event, and each object can be of a type selected from a group that includes: process object, file object, network object, registry object, and windows object. At least one of the objects represents the source of the event that performs a corresponding operation. By way of non-limiting example, the source of the event can be represented by a process object indicating an originating process that performs the operation. For example, a process P1 performs an operation of "system shutdown". In this case, a process object will be retrieved from the corresponding abstract event to represent P1 as the source of the event.

In some cases an operation is performed upon a target entity (i.e. target of the event) by the source of the event. For example, a process P1 opens a file F1. A process object will be retrieved from the corresponding abstract event to represent P1 as the source of the event for the operation "file open", and a file object will be retrieved to represent F1 as the target of the event.

It is to be noted that an operation is usually initiated by a process. Thus the source of an event is normally represented by a process object. The target of the event, however, can be of various types of objects that are manipulated in the operation, such as a process object, file object, network object, registry object, etc.

According to further embodiments, a process can own resources, such as a source file that the process is initiated from. The source file can be of various types, such as, by way of non-limiting example, a document file, an image file that contains the executable program that the process is launched from, or any other relevant types of files. A source file, if related to an operation, can also be represented by a file object.

It is to be noted that the above mentioned object types are merely illustrated for exemplary purposes only and should not be construed as limiting the present disclosure in any way. Additional types of objects that may occur in an operation can be included in addition to or instead of the above.

Following retrieving the objects from an abstract event, the event parsing module 106 can identify one or more relationships among the objects in accordance with the abstract event, and generate respective associations among the objects corresponding to the identified relationships, giving rise to an event context corresponding to the abstract event. The event context contains context information of the corresponding event, and comprises the one or more objects of the event and the associations therein.

The event parsing module 106 can further determine if a current event is a first event of a stateful model, as described below in detail with respect to FIG. 2A. In case of the above condition being met, a new stateful model can be generated and include the event context, namely, the one or more objects and the one or more associations therein. The process then repeats, wherein the next event data can be processed.

Figure 2A:
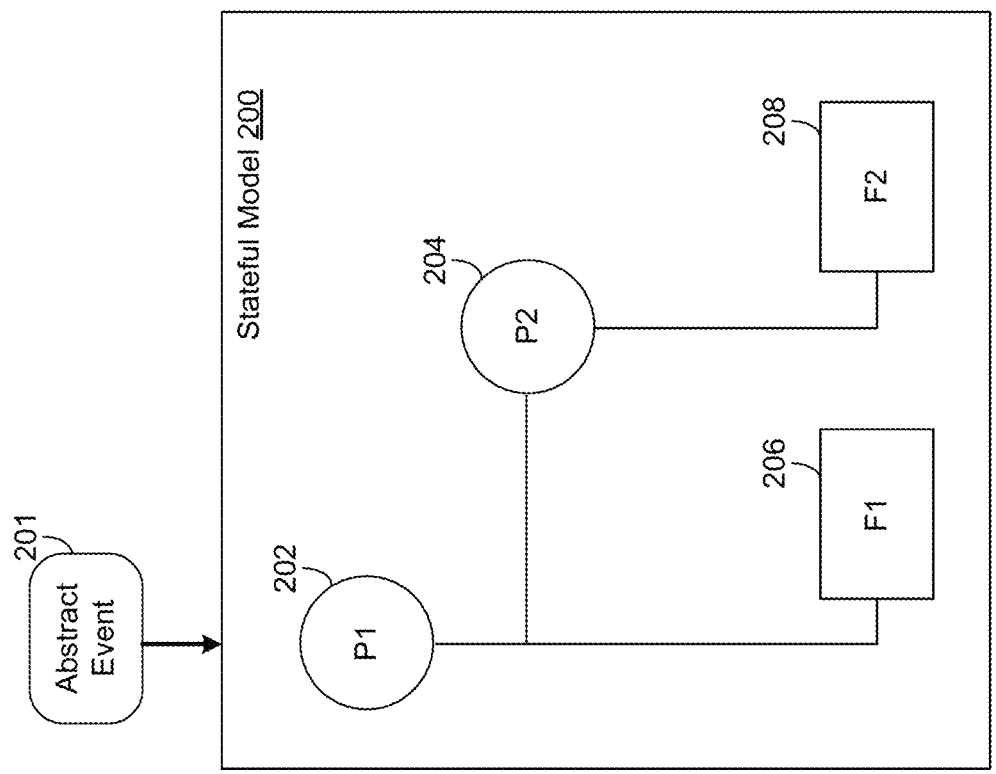
FIGS. 2A and 2B are schematic illustrations of an exemplified stateful model and an exemplified updated stateful model, in accordance with embodiments of the present disclosure.

FIG. 2A illustrates an example of a stateful model, in accordance with embodiments described herein.

In some embodiments, the exemplified stateful model 200 may be created based on an abstract event 201. Abstract event 201 is normalized from an event data characterizing an event E1 of a process P1 creating a child process P2. The abstract event 201 comprises the following attributes of the event: operation type—process creation; source of the event—P1 (as the originating process of the event), source file of P1-F1, target of the event—P2 (as a targeting process of the event), and source file of P2-F2.

Based on the abstract event 201, four objects can be retrieved: a process object 202 indicative of the source of the event P1, a process object 204 indicative of the target of the event P2, a file object 206 indicative of the source file F1 of P1, and a file object 208 indicative of the source file F2 of P2. According to certain embodiments, file objects 206 and 208 can be affiliated with, or correlated with, their respective process objects 202 and 204 as illustrated. The data for the abstract event 201 can further include additional attributes which contain more information of the operation if applicable.

A relationship indicative of process creation can be identified between process objects 202 and 204 in accordance with the abstract event. A corresponding association between 202 and 204 can be generated accordingly based on the identified relationship, giving rise to an event context that comprises the process objects 202 and 204 (together with their correlated file objects 206 and 208) and the association therebetween. The association can be represented, e.g., as a direct linkage between the two related objects 202 and 204, as illustrated in FIG. 2A.

According to certain embodiments, one or more fields can be created for each of the objects, storing one or more parameters characterizing the respective object and the association related thereto. By way of non-limiting example, the process object 202 can have one or more fields selected from a group that includes: process identifier (e.g., a unique identifier assigned by the operating system for each process), one or more source file identifiers (e.g., a pointer to file object 206), and one or more operations and corresponding associations related thereto (e.g., an operation of process creation and a corresponding linkage to P2). The file object 206 can have one or more of fields selected from a group that includes: file identifier (e.g., the full path of the file), process identifier, and one or more operations and corresponding associations related thereto. Assume that E1 is a first event in a stateful model, a stateful model 200 can be generated and include the event context of E1.

It should be noted that the term "stateful model" should be expansively construed to include any of the following situations:

1) A stateful model can be a program-level stateful model that represents a sequence of linked operations related to a given program (and in some cases, also operations related to one or more other programs that are linked to the given program due to operations). In this case, a stateful model represents a program context that reflects all the operations related to the given program by context.

A first event of the program-level stateful model can be determined to be any event that relates to the given program's first interaction with the system. For instance, a first event can be determined to be an event of "process creation" that creates the initiating process of the given program. An initiating process is the process that is created upon the given program being executed, which may also be the root process of a stateful model that performs further operations. A first event can also be determined to be an event performed by the initiating process upon other objects.

In the above example illustrated in FIG. 2A, if the originating process P1 is the initiating process of a certain program, the creation of P1 can be determined as the first event in the stateful model. Since the initiating process may be created by a system process P0, in some cases the stateful model can include P0, P1 and the association of process creation between P0 and P1. In some other cases the stateful model may include only the object P1, and a reference therewith indicating that P0 is the parent of P1. In some further cases a first event can also be determined as an event that P1 performs on other objects, for example, an event of "process creation" performed by P1 to create a child process P2.

In some circumstances events can be delayed to be processed by the event parsing module 106 due to unexpected system processing problems. Thus a first event of the stateful model can also be an event that does not occur first in terms of time, but is first processed by the event parsing module 106. Accordingly, following the above mentioned example of FIG. 2A, if a further event E2 of P2 opening a file F1 is first processed by the event parsing module 106, the event E2 can be determined to be a first event of the stateful model, and any event that occurs before it (e.g., the event E1 of P1 creating P2) can be processed retroactively and reflected in the stateful model.

Thus, depending on the number of programs concurrently running in the live environment and the operational relationships among them, there may be one or more program stateful models co-existing, each of which represents a respective program context of a given program;

2) A stateful model can be a system-level stateful model that represents operations related to all programs that run concurrently in a live environment. In this case a first event of the stateful model can be determined to be the event of "system start" that is initiated when the operating system initially starts. Accordingly, there is only one stateful model existing at any given time in the system which represents a system context of the entire environment. According to some embodiments, the system-level stateful model can be created upon the initialization of the operating system, and can be kept updating while the operating system and program processing proceeds. In accordance with further embodiments, the system-level stateful model may be created by including one or more program-level stateful models each related to one program of all the programs running in the live environment as described above.

It is to be noted that the definition and implementation of the above stateful model structure are illustrated for exemplary purposes only and should not be construed as limiting the present disclosure in any way. Alternative data structures can be applied to implement equivalent functionality of the stateful model in addition to or in lieu of the above.

If the current event is not a first event of a stateful model, a previous stateful model corresponding to at least one previous event that precedes the current event exists. The event parsing module 106 can update the previous stateful model based on the event context of the current event, giving rise to an updated stateful model that is updated.

According to certain embodiments, a previous stateful model can be updated in accordance with the following scenarios:

1) If all the objects of the current event are already included in the previous stateful model, the one or more associations of the event context can be added to the previous stateful model, giving rise to the updated stateful model;

2) Otherwise at least one object of the one or more objects should be a new object that does not exist in the previous stateful model. Thus the new object, together with the one or more associations, can be added to the previous stateful model, giving rise to the updated stateful model.

Continuing with the example illustrated in FIG. 2A, assume that the illustrated stateful model 200 (including process objects P1, P2 and the association between P1 and P2 representing the event E1 of P1 creating P2) is a previous stateful model that exists, and a current event E2 arrives, wherein the same process P1 allocates memory in the same child process P2. The event data that characterizes the current event E2 is normalized to an abstract event. Objects P1 and P2 are retrieved based on the abstract event. A relationship indicative of memory allocation can be identified between P1 and P2 based on the abstract event, and an association between P1 and P2 can be generated based on the identified relationship. Thus an event context for the current event E2 comprises objects P1 and P2 and the association therebetween. Since the current event E2 is not a first event in the previous stateful model 200, the stateful model 200 will be updated based on the current event context. In this case, since all the objects of the current event, namely, P1 and P2, are already included in the previous stateful model 200, the currently generated association between P1 and P2 representing an operation of memory allocation, will be added as a new association between P1 and P2 in the stateful model 200, besides the previous association therebetween representing the operation of process creation, giving rise to an updated stateful model. By way of non-limiting example, the new association can be added in the stateful model by adding a respective field for P1 and/or P2 to indicate the operation of memory allocation therebetween. Since only the association has been updated, the hierarchical structure of the updated stateful model may look similar as illustrated in FIG. 2A, with a newly added association.

Figure 2B:
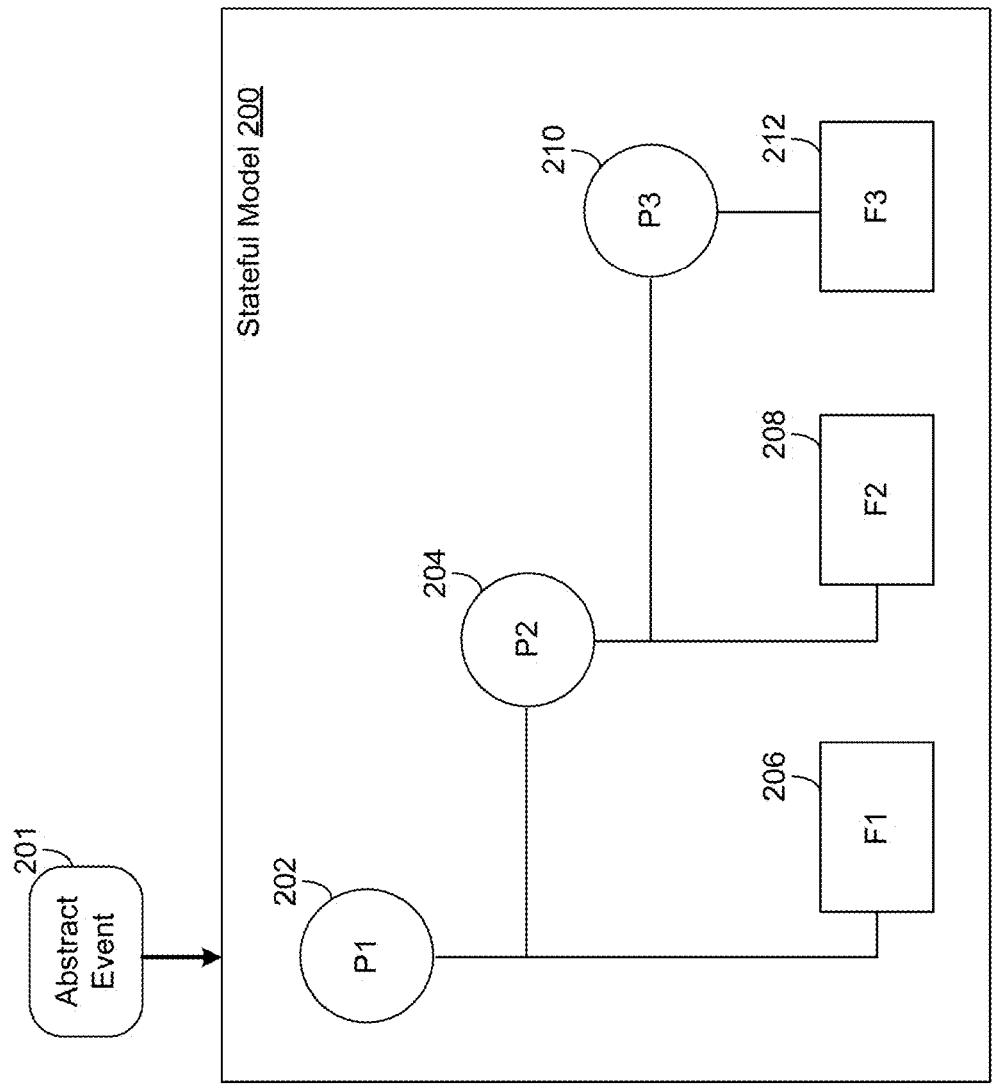

Continuing with the same example, assume that another event E3 arrives after E2, wherein the process P2 creates a child process P3. Following the same process, the event data that characterizes the current event E3 is normalized to an abstract event. Objects P2 and P3 are retrieved based on the abstract event. A relationship indicative of process creation can be identified between P2 and P3 based on the abstract event, and an association between P2 and P3 can be generated based on the identified relationship. Thus an event context for the current event E3 comprises objects P2 and P3 and the association therebetween. Since the current event E3 is not the first event in the stateful model 200, the stateful model 200 will be updated based on the current event context. In this case, since P3 is a new object that does not exist in the previous stateful model, the new object P3 can be added to the stateful model 200 as a process object 210. Optionally a file object F3 that is correlated with P3 can also be added as a file object 212. The association between P2 and the new object P3 can be added in the stateful model, by way of non-limiting example, by adding a respective field for P2 and/or P3 to indicate the operation of process creation therebetween, giving rise to an updated stateful model, as illustrated in FIG. 2B.

It is to be noted that the specific examples of building and updating the stateful model illustrated above are provided for exemplary purposes only and should not be construed as limiting. Accordingly, other ways of implementation of building and updating the stateful model can be used in addition to or in lieu of the above.

Figure 3:
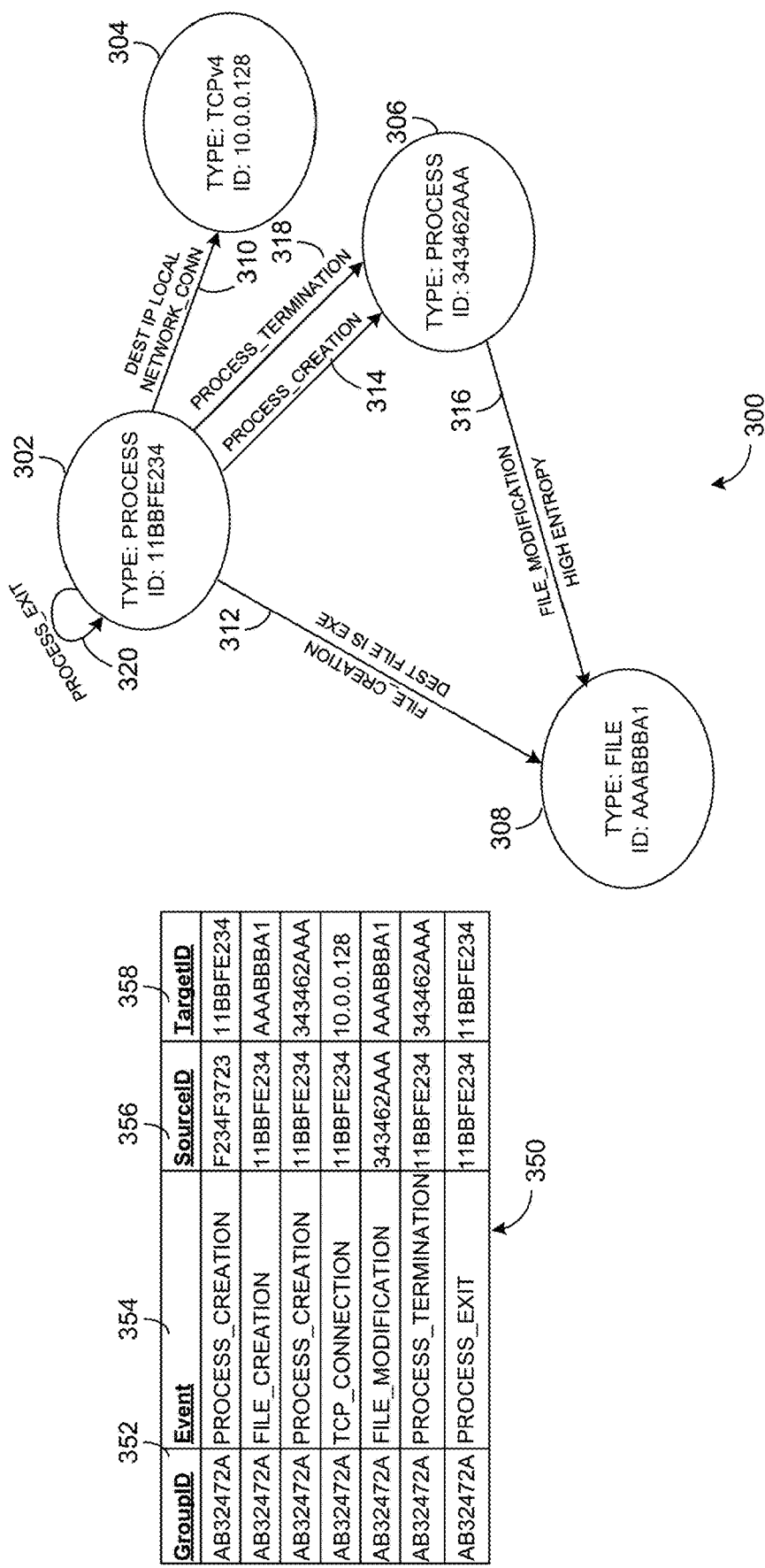
FIG. 3 illustrates an example of how a stateful model and its associated data can be represented as a graph, in accordance with some embodiments herein.

FIG. 3 illustrates how an example graph 300 may correspond to a stateful model, in accordance with some embodiments disclosed herein.

For a stateful model (e.g., the stateful models shown in FIGS. 2A and 2B), there may be a corresponding data table 350 may store information about the events associated with a stateful model, including the relative sequence or order that the events occurred. For example, each row of the data table 350 may correspond with an event associated with the stateful model. In some embodiments, the ordering of events in the data table 350 (e.g., the top-down order of rows) may correspond to the relative sequence or order that the events occurred. The GroupID column 352 may show an identifier for each event that indicates its grouping or associated stateful model; all the events from the same stateful model may have the same group identifier. The Event column 354 may indicate information indicating the type of each event (e.g., a process creation event). The SourceID column 356 and the TargetID column 358 may indicate identifiers of the source object and target object associated with each event.

In some embodiments, the information in the data table 350 may correspond to the fields created for objects and events during creation of the stateful model. For example, during generation of the stateful model, a process object that creates a file object can have one or more fields selected from a group that includes: a process identifier (e.g., a unique identifier assigned by the operating system for each process), one or more source file identifiers (e.g., a pointer to file object), and one or more operations and corresponding associations related thereto (e.g., an operation of process creation and a corresponding linkage). The file object can have one or more of fields selected from a group that includes: file identifier (e.g., the full path of the file), process identifier, and one or more operations and corresponding associations related thereto. Accordingly, a row in the data table 350 that corresponds to this file creation event may indicate a file creation event type in the Event column 354, the process identifier assigned to the originating process in the SourceID column 356, and the file identifier assigned to the created file in the TargetID column 358.

In some embodiments, a graph may be adapted that corresponds to the stateful model and the data in its corresponding data table 350. In computer science, a graph is an abstract data type that is meant to implement the undirected graph and directed graph concepts from the field of graph theory within mathematics. A graph consists of a finite (and possibly mutable) set of vertices (also called nodes or points), together with a set of unordered pairs of these vertices for an undirected graph or a set of ordered pairs for a directed graph. These pairs are known as edges (also called links or lines), and for a directed graph are also known as edges but also sometimes arrows or arcs. The vertices may be part of the graph, or may be external entities represented by integer indices or references.

It should be noted that a graph data structure may be any suitable data structure that can be used to capture all the information of a graph and its attributes, such as the overall structure and connectivity of the nodes and edges in the graph, the information associated with each node, the information associated with each edge, and so forth. For instance, in some embodiments, a set of matrices or arrays can be used for the graph data structure to store all the information of a graph and its attributes. Information may be embedded in the nodes and/or edges of the graph data structure, e.g., by associating each edge with some edge value, such as a symbolic label or a numeric attribute (cost, capacity, length, etc.).

For example, graph 300 in FIG. 3 may correspond a hypothetical stateful model and the data table 350. The graph 300 has multiple nodes and directed edges connecting pairs of nodes. The stateful model and any important information associated with it can be embedded into the nodes and edges of the graph 300.

In some embodiments, the nodes of the graph represent various objects in the stateful model, such as processes and files. For example, in graph 300, the node 302 represents a process (with ID: 11BBFE234), node 304 represents an endpoint (with ID: 10.0.0.128, e.g., IP address), node 306 represents a process (with ID: 343462AAA), node 308 represents a file (with ID: AAABBBA1).

In some embodiments, each directed edge connecting a pair of nodes in the graph represents an event in the stateful model, examples of which include process creation, process termination, process modification, IP connect, IP listen, file modification, file creation, file scan, and file deletion. The direction of the edge (e.g., the arrow) indicates the source and the target associated with the corresponding event. For example, in graph 300, a directed edge 312 spans from node 302 to node 308, indicating that the node 302 process created the node 308 file. A directed edge 314 spans from node 302 to node 306, indicating that the node 302 process created the node 306 process. Then, a directed edge 310 spans from node 302 to node 304, indicating that the node 302 process initiated a network connection with the node 304 endpoint. A directed edge 316 spans from node 306 to node 308, indicating that the node 306 process then modified the node 308 file. The directed edge 318 spans from node 302 to node 306, indicating that the node 302 process terminated the node 306 process. The directed edge 320 then indicates that the node 302 process then exited.

Figure 4:
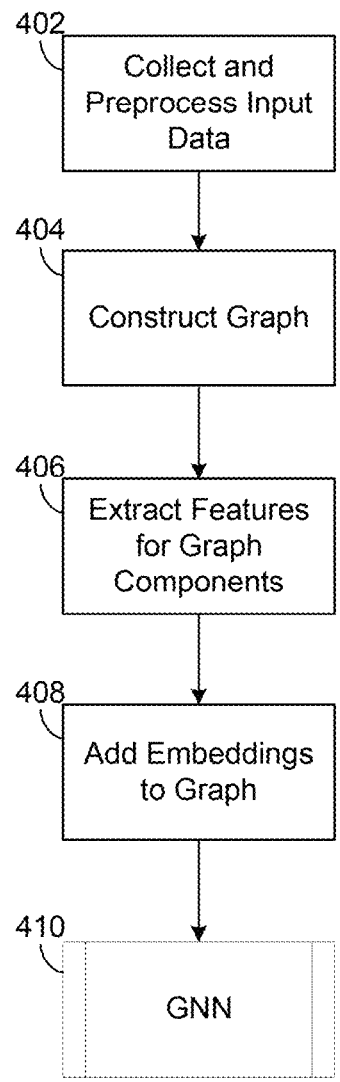
FIG. 4 is a generalized flowchart of generating a graph input for a GNN, in accordance with embodiments of the present disclosure.

FIG. 4 illustrates a process for generating graph inputs for GNNs based on stateful models obtained from monitoring operations on an endpoint, in accordance with embodiments of the present disclosure.

This process is illustrated and described within the context of processing a single stateful model on an endpoint and applying machine learning models for real-time threat classification and malware detection. However, a person skilled in the art will recognize that these steps can also be adapted and used for training machine learning models or for processing training data to train those models. For example, a large amount of training data (e.g., associated with many observed stateful models) can be collected and similarly processed to train different models for feature extraction, transforming embeddings, and/or performing predictive tasks on graphs. In some embodiments, the training data may include labels (e.g., classifications for the various stateful models).

At block 402, input data may be collected and preprocessed. This input data may include a stateful model obtained from monitoring operations on an endpoint and any associated stateful model data. Examples of stateful model data may include the fields assigned to the objects and events in the stateful model and any information about the stateful model (e.g., the number of processes in the stateful model that are LOLBins). Generally, the input data may include any information that may be a useful feature for analyzing a stateful model and classifying threats.

At block 404, a graph (e.g., a graph data structure or representation) with nodes and edges may be constructed based off the stateful model. Graphs have up to four types of information that can be used to make predictions: nodes, edges, global-context and connectivity. Accordingly, the objects in the stateful model may be represented by nodes in the graph, and the events or links in the stateful model may be represented by edges in the graph.

In some embodiments, the graph may be embodied or represented in a series of matrices, vectors, and/or tuples. For example, the nodes can be represented by a node feature matrix N, by assigning each node an index i and storing the feature vector for node-i in N. The edges may be represented in a feature matrix E by assigning each edge an index i and storing the feature vector for edge-i in E. The global context may be represented by a feature vector. The structure and connectivity of the graph may be represented in an adjacency matrix or an adjacency list, which describes the connectivity of edge e-k between nodes n-i and and n-j as a tuple (i,j) in the k-th entry of an adjacency list. Accordingly, the graph data structure may comprise a set of matrices, vectors, and/or tuples.

At block 406, feature vectors may be extracted for each of the various components of the graph (such as the nodes, edges, and global context) using the stateful model and the input data collected at block 402. More specifically, the relevant information associated with each component of the graph may be converted into an array of numbers (e.g., a feature vector) that is easier for machine learning models to work with. For example, an object in the stateful model may be represented by a node, and categorical information about that object (e.g., that the object is a process) may be converted into a number that is included in the feature vector that corresponds to that node. The feature vector for that node may include many numbers (e.g., features) based on the amount of information available and relevant to a machine learning model. Accordingly, based on the stateful model data and any additional input data collected, a feature vector may be created for each node and edge in the graph. In some embodiments, a feature vector may also be created for the global context of the graph.

In some embodiments, one or more trained machine learning models, such as a neural network, may be used to automatically extract features from the stateful model data and any additional input data. In some embodiments, a single model may be used to extract features for the components of the graph. In some embodiments, different models may be used to extract features for different types of components of the graph. For example, a trained neural network may be used to extract features for nodes in the graph, another neural network may be used to extract features for edges in the graph, and another neural network may be used to extract features for the global context.

At block 408, the features may be added as embeddings to the graph. For example, in some embodiments, the features vectors for all the nodes may be added to the node feature matrix, the feature vectors for all the edges may be added to the edge feature matrix, and so forth. In some embodiments, feature reduction techniques may be used to reduce the dimensionality of the features before they are embedded into the graph.

At block 410, the graph and its embeddings may be provided as an input to a GNN. In some embodiments, the GNN may adopt a "graph-in, graph-out" architecture, meaning that it accepts a graph as input, with information loaded into its nodes, edges and global-context, and progressively transform these embeddings, without changing the connectivity of the input graph.

The GNN may output a graph with updated embeddings that can be used for predictive tasks (e.g., as an input for a classification model), which is further described in connection with FIG. 6. This may be done over many layers (e.g., the GNN may comprise many layers), and a simplified explanation of a GNN layer is described in connection with FIG. 5.

Figure 5:
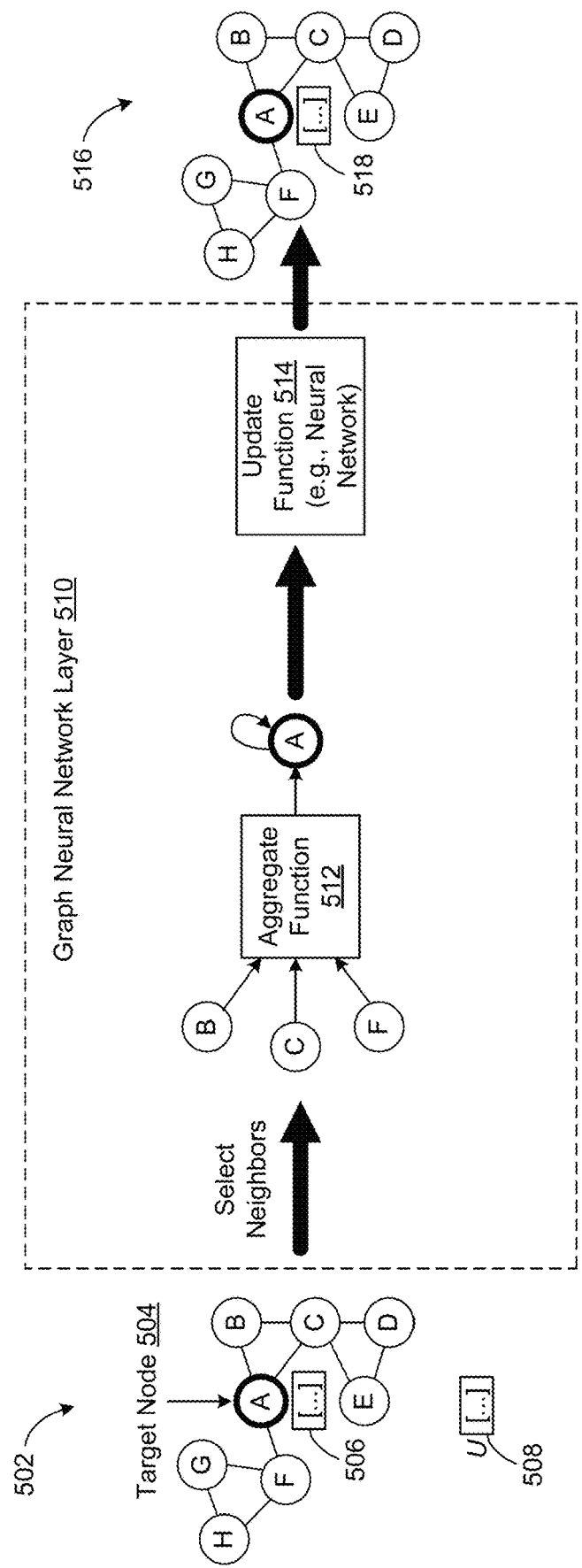
FIG. 5 illustrates an example of how a GNN layer updates a graph, in accordance with embodiments of the present disclosure.

FIG. 5 illustrates an example GNN layer for transforming a graph and its embeddings, in accordance with embodiments disclosed herein.

An example input graph 502 is shown with nodes and edges. Not all the information that may be stored or embedded in the various components of the input graph 502 (e.g., each node—node embedding, each edge—edge embedding, and the entire graph—graph embedding) is shown. The only embeddings shown are node embedding 506 for node A (e.g., target node 504) and embedding 508 for the global context of the graph.

In order to enable a machine learning model to take full advantage of all the information in the graph 502 (e.g., information stored in the nodes, information stored in the edges, and the overall connectivity of the graph), information has to be pooled by routing information between different parts of the graph. For instance, there may be information in the graph stored in neighboring nodes or neighboring edges that is needed to make a prediction on a node, which requires collecting information from neighboring nodes and/or edges and giving them to the node for prediction.

This can be accomplished through messaging passing using a GNN layer, which has two main components—an aggregation/pooling function and an update function. To facilitate ease of understanding, FIG. 5 illustrates only a single GNN layer 510 in which node-to-node message passing is used to embed a single target node 504 (e.g., node A) with information about its neighboring nodes. However, in practice, each node in the graph 502 could be updated with information about its respective neighboring nodes over a single GNN layer.

In some embodiments, the embedding for each target node is enriched by aggregating the messages received from all its neighboring nodes. For example, target node 504 (e.g., node A) is identified to have neighboring nodes B, C, and F. The first component of the GNN layer 510, the aggregation function 512, involves taking as input the representations or messages of node A's neighbors (e.g., the embeddings for nodes B, C, and F) and aggregating them (e.g., like sum or mean). The aggregated messages are passed with the embedding of node A through an update function 514, usually a learned neural network. The update function 514 produces an updated embedding 518 for node A, which now incorporates information from the aggregated embeddings of its neighboring nodes. This can be done for all nodes, so that each node's updated embedding becomes a weighting of its previous embeddings and a weighting of its neighbor's embedding.

Although FIG. 5 only illustrates message passing using a single GNN layer 510, this overall process can be performed iteratively; the rounds of message passing can be viewed as a series of layers. Additional GNN layers can then be stacked to enable message passing beyond immediate neighbors. By stacking message passing GNN layers together, a node can eventually incorporate information from across the entire graph: after three layers, a node has information about the nodes three steps away from it. Over sufficient rounds of message passing and GNN layers, a final graph can be obtained with embeddings for each node in the graph that well describe it given the larger context.

It should be noted that information from neighboring edges can be incorporated, in the same fashion as neighboring node information (e.g., by first pooling neighboring edge information and transforming it with an update function into an updated embedding). However, the node and edge information stored in a graph are not necessarily the same size or shape. A linear mapping from the space of edges to the space of nodes, and vice versa, could be used. Or neighboring edge information can be concatenated with the target embedding before the update function. Furthermore, the embedding of a target edge can be updated, in addition to, or instead of, the embedding of a target node. Accordingly, in some embodiments, message passing with a GNN layer can be performed at least node-to-node, node-to-edge, edge-to-edge, and/or edge-to-node.

However, nodes that are far away from each other in the graph may never be able to efficiently transfer information to one another, even if message passing is applied several times. For one node, there are k-layers in the GNN, information will propagate at most k-steps away. This can be a problem for situations where the prediction task depends on nodes, or groups of nodes, that are far apart. One solution would be to have all nodes be able to pass information to each other. Unfortunately for large graphs, this quickly becomes computationally expensive.

Another solution is to use a global representation of a graph (U) which is sometimes called a master node or global context vector (e.g., a graph-level embedding 508). This global context vector is connected to all other nodes and edges in the graph, and can act as a bridge between them to pass information, building up a representation for the graph as a whole. This creates a richer and more complex representation of the graph than could have otherwise been learned. In other words, the global context vector can be updated or used to update node/edge embeddings in a GNN layer. Accordingly, in some embodiments, message passing with a GNN layer can be performed at least node-to-node, node-to-edge, node-to-global, global-to-node, edge-to-edge, edge-to-node, edge-to-global, and/or global-to-edge.

Furthermore, any combination of information from neighboring nodes, neighboring edges, and/or the global context can be incorporated to update a particular graph attribute in a GNN layer. In some embodiments, the set of information can be leveraged during pooling by conditioning the embedding on the graph attribute of interest with respect to that set of information. For example, a target node's embedding can be updated by considering information from neighboring nodes, connected edges, and also the global information. In some embodiments, to condition the new node embedding on all these possible sources of information, they can be simply concatenated during the pooling step. In some embodiments, the different types of embeddings may be mapped to the same space via a linear map (e.g., to put node, edge, and global embeddings into a similar format) and added. In some embodiments, a feature-wise modulation layer may be applied to the different embeddings, which can be considered a type of feature-wise attention mechanism.

As such, there may be many design decisions when constructing GNNs and also in constructing GNN layers. In some embodiments, each GNN layer may factor in decisions on which types of graph attributes (e.g., nodes, edges, and/or global-context) are updated. In some embodiments, each GNN layer may factor in decisions on what information is used to update a type of graph attribute (e.g., for targets nodes, consider information from neighboring nodes, connected edges and the global information). In some embodiments, each GNN layer may factor in decisions on the order that different types of graph attributes are updated (e.g., updating node embeddings before edge embeddings, or the other way around).

Furthermore, these decisions are not relegated to just a single GNN layer and they may also be applied across different layers of the GNN. For example, two adjacent GNN layers may be ordered so that node embeddings are updated in the first GNN layer of the pair and edge embeddings are updated in the second GNN layer of the pair, or the other way around. Accordingly, in some embodiments, the entire GNN may factor in decisions on which types of graph attributes (e.g., nodes, edges, and/or global-context) are updated in which layers. In some embodiments, the entire GNN may factor in decisions on what information is used to update graph attributes in which layers. In some embodiments, the entire GNN may factor in decisions on the order that different types of graph attributes are updated across the different layers.

In some embodiments (not shown), the GNN may be an attentional GNN (also known as Graph Attention Networks) that uses a self-attention mechanism similar to transformer models to learn weights between each couple of connected nodes.

To summarize, a GNN consists of a number of layers, each of which updates the representation of each node (and/or each edge and/or the global-context) based on its local neighborhood. For example, the representation of each node is typically a low-dimensional vector that encodes the node's properties and its relationships with other nodes. The layers of a GNN are designed to capture increasingly complex features of the graph by aggregating information from the neighborhood of each node. In some embodiments, each GNN layer generates an output graph based on the input graph. In some embodiments, each GNN layer does not update the connectivity of the input graph, and the output graph of has the same adjacency list and the same number of feature vectors as the input graph. The output graph just has updated embeddings, since the GNN layer has updated each of the node embeddings.

Figure 6:
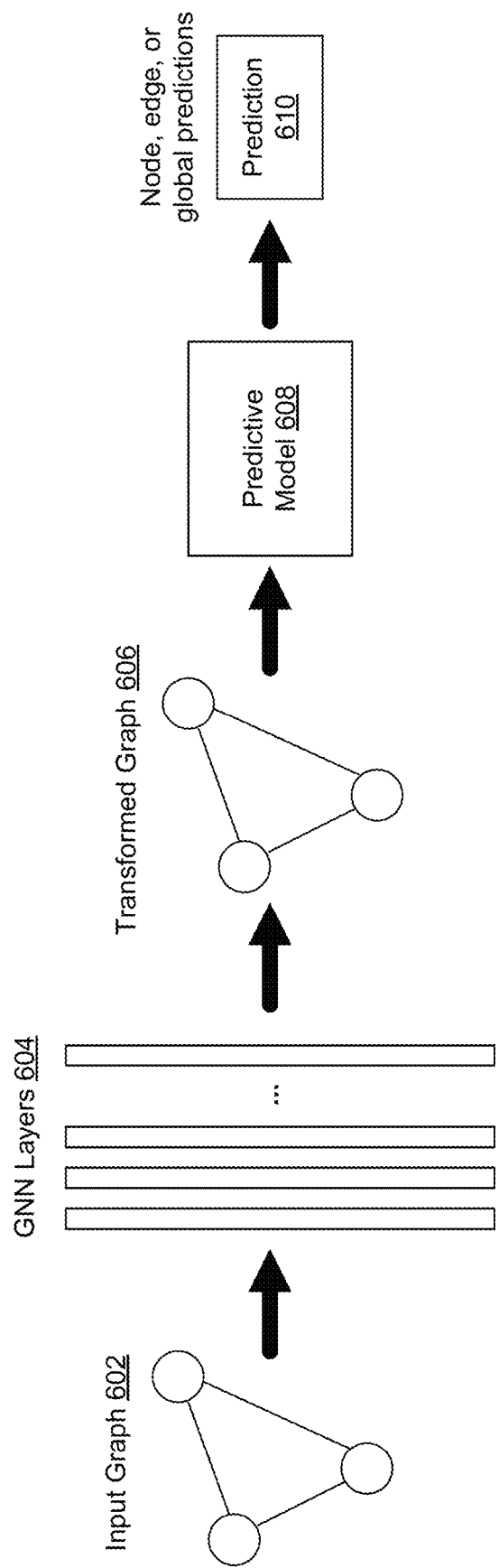
FIG. 6 illustrates an example of applying a GNN for predictive tasks in behavior-based analysis, in accordance with embodiments of the present disclosure.

FIG. 6 illustrates an example of applying a GNN for predictive tasks in behavior-based analysis, in accordance with embodiments of the present disclosure.

After all the GNN layers 604 have been applied to an input graph 602, the final output graph 606 and its transformed embeddings can be used to train or apply one or more predictive machine learning models to perform predictive tasks on graphs at various different levels, such as graph-level prediction (e.g., predicting a single property for a whole graph), node-level prediction (predicting some property for a node in a graph), and edge-level prediction (e.g., predicting the property or presence of an edge in a graph). For example, the finalized graph 606 can be used to train or apply a predictive model 608 to generate a prediction 610.

In some embodiments, the predictive model 608 may be a scoring model, and the generated prediction 610 may be associated with a score. For example, the predictive model 608 may generate a behavior score that corresponds to a degree of suspiciousness of the behavior in the stateful model the graph is based on. In some embodiments, the predictive model 608 may be a classification model, and the generated prediction 610 may be a classification. For example, the predictive model 608 may classify or identify any threat associated with the stateful model the graph is based on. In some embodiments, the predictive model 608 may be a neural network. In some embodiments, the predictive model 608 may be based on a learning algorithm such as logistic regression, linear regression, naïve Bayes, linear discriminant analysis, stochastic gradient descent, K-Nearest neighbors, decision trees, random forest, or support vector machines.

In some embodiments, the model 608 may be used for graph-level prediction tasks, such as classification of a graph, associated with behavior-based analysis. For example, in some embodiments, a machine learning model may be trained to analyze a graph corresponding to a stateful model and classify it as a threat (e.g., embodying a series of operations that fit a behavioral pattern associated with malware) or benign.

In some embodiments, the model 608 may be used for node-level prediction tasks, such as predicting the identity or role of each node within a graph, associated with behavior-based analysis. For example, in some embodiments, a machine learning model may be trained to analyze a node in a graph corresponding to a stateful model to classify the node and its corresponding object in the stateful model. In other words, different types of objects in the stateful model can be further classified. For instance, objects can be classified as suspicious, malicious, or benign; process objects may be classified as LOLBins; and so forth.

In some embodiments, the model 608 may be used for edge-level prediction tasks, such as to predict the presence or property of an edge in the graph, associated with behavior-based analysis. For example, in some embodiments, a machine learning model may be trained to analyze a graph corresponding to a stateful model to predict an event or relationship between objects in the stateful model (e.g., assuming this behavior pattern is suspicious, then we should expect that this process object will delete this file object that it created) or to classify an event (e.g., this is a suspicious event).

All or some of the information associated with the final output graph 606 may be used as inputs for the predictive model 608; in some embodiments, a machine learning model trained or applied for graph-level, node-level prediction, and/or edge-level prediction may use any combination of the information within the final output graph 606 and its transformed embeddings, including any combination of the transformed graph-level embedding, the transformed node embeddings, and/or the transformed edge embeddings. For example, in some embodiments, a model can be trained or applied for graph-level prediction using all the transformed embeddings. As another example, in some embodiments, a model can be trained or applied for node-level prediction using the transformed node embeddings and the transformed graph-level embedding, but not the transformed edge embeddings.

In some embodiments, the inputs for the predictive model 608 may include additional information beyond the final output graph 606 and its embeddings. For example, a model 608 used to classify the graph as a threat may also consider information such as the number of process objects in the stateful model that are LOLBins, the number of file objects in the stateful model that were in temporary directories, the number of file objects in the stateful model that were in system directories, and so forth. In some embodiments, features may be extracted from this additional information and used an additional inputs for the model 608.

There may be numerous benefits to a GNN-based approach for classifying behaviors or threats from stateful model data. In particular, graphs can be used to describe complex connections and GNNs can be used to learn those complex connections. Accordingly, the overall structure of the stateful model or storyline has an effect on any predictions made.

Figure 7:
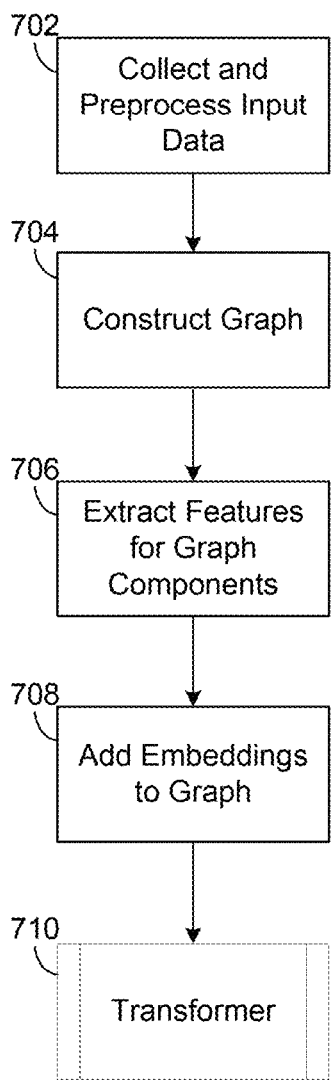
FIG. 7 is a generalized flowchart of generating a graph input for a transformer using stateful model data, in accordance with embodiments of the present disclosure.

FIG. 7 is a generalized flowchart of generating an input for a transformer, in accordance with embodiments of the present disclosure.

At block 702, input data may be collected and preprocessed. This input data may include a stateful model obtained from monitoring operations on an endpoint and any associated stateful model data. Examples of stateful model data may include the fields assigned to the objects and events in the stateful model and any information about the stateful model (e.g., the number of processes in the stateful model that are LOLBins). Generally, the input data may include any information that may be a useful feature for analyzing a stateful model and classifying threats.

At block 704, a graph (e.g., a graph data structure or representation) with nodes and edges may be constructed based off the stateful model. Graphs have up to four types of information that can be used to make predictions: nodes, edges, global-context and connectivity. Accordingly, the objects in the stateful model may be represented by nodes in the graph, and the events or links in the stateful model may be represented by edges in the graph.

In some embodiments, the graph may be embodied or represented in a series of matrices, vectors, and/or tuples. For example, the nodes can be represented by a node feature matrix N, by assigning each node an index i and storing the feature vector for node-i in N. The edges may be represented in a feature matrix E by assigning each edge an index i and storing the feature vector for edge-i in E. The global context may be represented by a feature vector. The structure and connectivity of the graph may be represented in an adjacency matrix or an adjacency list, which describes the connectivity of edge e-k between nodes n-i and and n-j as a tuple (i,j) in the k-th entry of an adjacency list.

At block 706, feature vectors may be extracted for each of the various components of the graph (such as the nodes, edges, and global context) using the stateful model and the input data collected at block 702. More specifically, the relevant information associated with each component of the graph may be converted into an array of numbers (e.g., a feature vector) that is easier for machine learning models to work with. For example, an object in the stateful model may be represented by a node, and categorical information about that object (e.g., that the object is a process) may be converted into a number that is included in the feature vector that corresponds to that node. The feature vector for that node may include many numbers (e.g., features) based on the amount of information available and relevant to a machine learning model. Accordingly, based on the stateful model data and any additional input data collected, a feature vector may be created for each node and edge in the graph. In some embodiments, a feature vector may also be created for the global context of the graph.

In some embodiments, one or more trained machine learning models, such as a neural network, may be used to automatically extract features from the stateful model data and any additional input data. In some embodiments, a single model may be used to extract features for the components of the graph. In some embodiments, different models may be used to extract features for different types of components of the graph. For example, a trained neural network may be used to extract features for nodes in the graph, another neural network may be used to extract features for edges in the graph, and another neural network may be used to extract features for the global context.

At block 708, the features may be added as embeddings to the graph. For example, in some embodiments, the features vectors for all the nodes may be added to the node feature matrix, the feature vectors for all the edges may be added to the edge feature matrix, and so forth. In some embodiments, feature reduction techniques may be used to reduce the dimensionality of the features before they are embedded into the graph.

At block 710, the graph and its embeddings may be provided as an input to a transformer. In some embodiments, the transformer may accept a graph as input, with information loaded into its nodes, edges and/or global-context.

Figure 8:
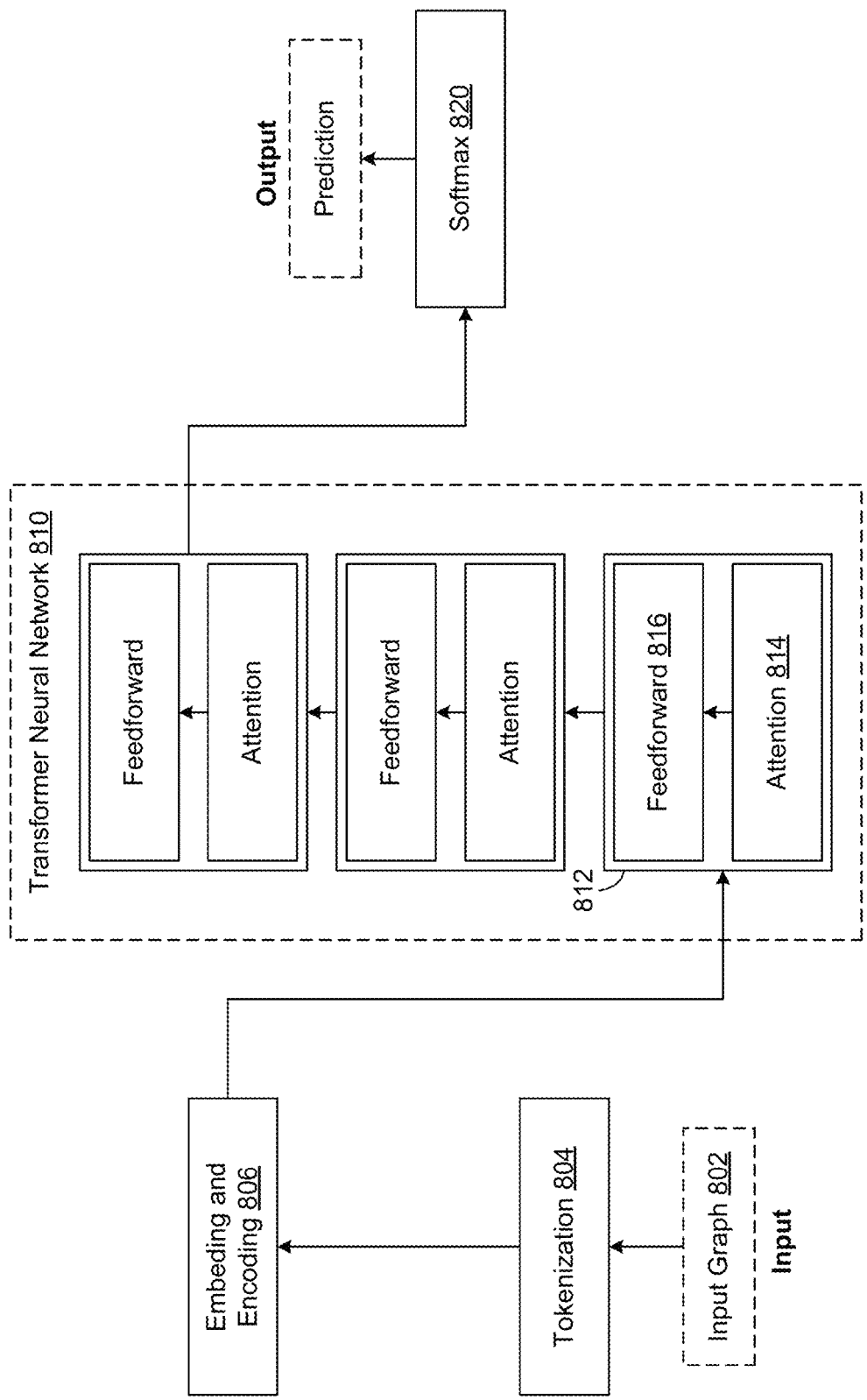
FIG. 8 is a generalized flowchart for applying a transformer for predictive tasks in behavior-based analysis, in accordance with embodiments of the present disclosure.

FIG. 8 is a generalized flowchart for applying a transformer for predictive tasks in behavior-based analysis, in accordance with embodiments of the present disclosure.

Like recurrent neural networks (RNNs), transformers have become famous due to their ability to process and model sequential information, especially for use cases such as natural language processing (with applications towards tasks such as translation and text summarization).

Unlike RNNs, transformers can process the entire input all at once and are incredibly good at keeping track of context since they utilize an attention mechanism that provides context for any position in the input sequence. Not only can they make sense of a sequence of words in a sentence, but they can also keep track of the larger context while 'writing' and generating consecutive words within that context. Transformers also adopt the mechanism of self-attention, differentially weighting the significance of each part of the input data. For natural language processing, this self-attention mechanism captures the semantic similarity between tokens in a sentence or sentence-like structures.

The basic transformer architecture has five main parts: tokenization, embedding, positional encoding, a series of transformer blocks, and softmax. For natural language processing and an input of a sentence (e.g., sequence of words), the tokenization step takes every word, prefix, suffix, and punctuation sign, and assigns them to a known token from a library (e.g., a large dataset of tokens, including all the words, punctuation signs, etc). Once the input has been tokenized, the embedding step turns each token into numbers. More specifically, the text embeddings converts every piece of text to a vector (e.g., an array) of numbers. If two pieces of text are similar, then the numbers in their corresponding vectors are similar to each other (componentwise, meaning each pair of numbers in the same position are similar). Otherwise, if two pieces of text are different, then the numbers in their corresponding vectors are different.

Afterwards, positional encoding is performed to modify the vectors, so that each modified vector additionally carries information about the relative position of the token. For example, positional encoding may involve adding a positional vector to each word, in order to keep track of the positions of the words. Positional encoding consists of adding a sequence of predefined vectors to the embedding vectors of the words, ensuring a unique vector for every sentence, and sentences with the same words in different order will be assigned different vectors. Thus, a vector is obtained for every token that takes into account the order and position of the respective token. This positional encoding encodes the sequential relationship among the words in the sentence. It is important because the transformer would otherwise not understand the sequence and ordering of words in a sentence, and where in the sequence a particular word is located.

In order to perform a task such as predicting the next word in the sentence, a large neural can be trained with that goal (e.g., to predict the next word in a sentence) in mind so that the trained model can be applied to input data. The large feedforward network, (e.g., a transformer) can be formed of several blocks of smaller neural networks, and an attention component is added to each one of these blocks. Each component of the transformer, called a transformer block, is then formed by two main components: the attention component and the feedforward component.

Like with message passing, the attention component moves the words in a sentence (or piece of text) closer in the word embedding, so that a word's embedding will carry some information of its neighboring words (e.g., providing context). The transformer blocks carry out repeated transformations on the vector representations of the words, extracting more and more linguistic information. These consist of alternating attention and feedforward layers.

The transformer outputs scores for all the words, where the highest scores are given to the words that are most likely to be next in the sentence. In some cases, there can be a softmax or unembedding layer, which converts the final vector representations back to a probability distribution over the tokens. In other words, the softmax can turn scores into probabilities (that add to one), where the highest scores correspond to the highest probabilities.

Once a transformer has been trained to predict the next word, post-training can be performed to teach the transformer to do more specific tasks, such as to answer questions, perform as a chatbot, write code, and so forth.

Turning back now to FIG. 8, just like how transformers can make sense of a sequence of words in a sentence, a stateful model or storyline can be thought of as a sequence of events (e.g., between different types of objects in the stateful model). This similarity may allow transformers to be adapted for use with stateful models to make sense of the sequence of events in a the stateful model. However, instead of words serving as the tokens, objects and/or events in the stateful model may serve as tokens.

Although theoretically, feature vectors for objects and/or events in the stateful model can be passed as inputs to a transformer, it may be preferable to pass an input graph 802 instead because it preserves the structure of the graph and the spatial relationships between nodes. Accordingly, a graph representation of the stateful model may be generated to serve as the input graph 802 for the transformer. In some embodiments, the transformer technique used may be adapted for use with graphs as input data, and such transformers may sometimes be referred to as graph transformers or graphormers.

There may be many different ways to adapt the transformer architecture to learn on graphs. In general, various structural embedding or encoding methods can be used to model a graph's structure and other useful information in the graph (e.g., centrality encoding and spatial encoding). Other examples of these different approaches include incorporating adding a virtual node to represent graph-level representation (similar to message passing in GNNs when there are many nodes), selecting different types of tokens (e.g., nodes and/or edges for tokens), using Laplacian eigenvectors to replace position/spatial encoding, and so forth.

At block 804, the desired attributes of the input graph 802 are tokenized. Just nodes can be tokenized, just edges can be tokenized, or nodes and edges can be tokenized. Additionally, in some embodiments, an extra graph-level token can be added in order to make graph-level predictions. However, selecting nodes as tokens means that the information in the edges between nodes must be somehow encoded into the node features at block 806, and selecting the edges as tokens means that information in the nodes must be somehow encoded into the edge features at block 806. An example embodiment in which nodes and edges are both used as features is discussed in connection with FIG. 9.

At block 806, the tokens may be converted to feature vectors (e.g., an array of numbers) and embedded with information about the tokens. For example, a node's feature vector may be embedded with information about that node. This information may include a subtype for the token. For example, for nodes, it may include the type of object (e.g., process, file, etc.) corresponding to the node in the stateful model, and for edges, it may include the type of event (e.g., process creation, process termination, file creation, etc.) corresponding to the edge in the stateful model. In some embodiments, one of the tokens may be a graph-level token, and a graph-level feature vector may be embedded with information about the graph.

Encoding may be performed to add to modify the feature vectors for the tokens, so that each feature vector carries additional information about the context of surrounding graph attributes (neighboring nodes or edges) and/or the overall graph (e.g., the relative position of the token in the graph, the structure and connectivity of the graph, etc.). This is necessary to provide the transformer an understanding of the structure and connectivity of the graph. In other words, the structure and connectivity of the graph may be embedded and encoded at step 806 into the feature vectors provided to the transformer.

In some embodiments, centrality encoding may be performed and added to the feature vector. For example, when nodes are tokens, centrality encoding may be performed and added to feature vector of the nodes to provide context about the position of a node in the graph, the importance of the node in the graph, the connectiveness of the nodes in the graph, and so forth. In some embodiments, a centrality encoding may involve adding a centrality vector to each token's feature vector.

In some embodiments, positional or spatial encoding may be performed and added to the feature vector. For example, when nodes are tokens, spatial encoding may be performed and added to the feature vector of the nodes to provide context about the spatial position of a node in the graph, the relative distance between nodes in the graph, and so forth. In some embodiments, spatial encoding may involve adding a spatial vector to each token's feature vector.

In some embodiments, sequencing encoding may be performed and added to the feature vector. For example, when edges are tokens, sequencing encoding may be performed and added to the feature vector of the edges to provide context about the relative sequence and order of occurrence for the events associated with the edges in the graph. In some embodiments, sequencing encoding may involve adding a sequencing vector to each token's feature vector.

In some embodiments, connectivity encoding may be performed and added to the feature vector. For example, connectivity encoding may be performed and added to the feature vector of the tokens to provide context about which nodes and/or edges are connected in the graph. In some embodiments, connectivity encoding may involve adding a connectivity vector to each token's feature vector.

In some embodiments, edge encoding may be performed and added to the feature vector. For example, when nodes are tokens, edge encoding may be performed and added to the feature vector of the nodes to provide context about which nodes are connected by edges, the information associated with a particular edge, the directionality of a particular edge, and so forth.

In some embodiments, node embedding may be performed and added to the feature vector. For example, when edges are tokens, node encoding may be performed and added to the feature vector of the edges to provide context about which pairs of nodes that each respective edge links, the information associated with that pair of nodes, the directionality of the edge, and so forth.

Afterwards, the feature vectors of the tokens may be provided as input to a transformer neural network 810, which can be trained for any suitable predictive task. The transformer neural network 810 may comprise a number of transformer blocks 812, each of which include an attention component 814 and feedforward component 816. The transformer blocks 812 may carry out repeated transformations on the vector representations of the tokens based on context, to eventually output a final set of vector representations of all the tokens. In some embodiments, there may be a softmax 820 or unembedding step to transform the final vector representations into scores or probability distributions.

Examples of predictive tasks include graph-level predictions, node-level predictions, edge-level predictions, and so forth. In some embodiments, the final transformed graph-level feature vector (e.g., graph token) may be used to make graph-level predictions. For example, in some embodiments, the transformer neural network 810 may be trained to determine whether the stateful model associated with the input graph 802 is suspicious or benign. In some embodiments, the transformer neural network 810 may be trained to classify or identify a threat associated with the input graph 802 and its corresponding stateful model.

In some embodiments, the final transformed feature vectors for nodes may be used to make node-level predictions. For example, the transformer neural network 810 may be trained to determine whether a process object or file object within the stateful model associated with the input graph 802 is suspicious or benign.

In some embodiments, the final transformed feature vectors for edges may be used to make edge-level predictions. For example, the transformer neural network 810 may be trained to determine whether a particular event within the stateful model associated with the input graph 802 is suspicious or benign.

In some embodiments, post-training can be performed to improve the transformer at performing specific tasks. For example, beyond classifying behavior as suspicious or benign, the behavior may be classified as being associated with a particular type of threat, and so forth.

Figure 9:
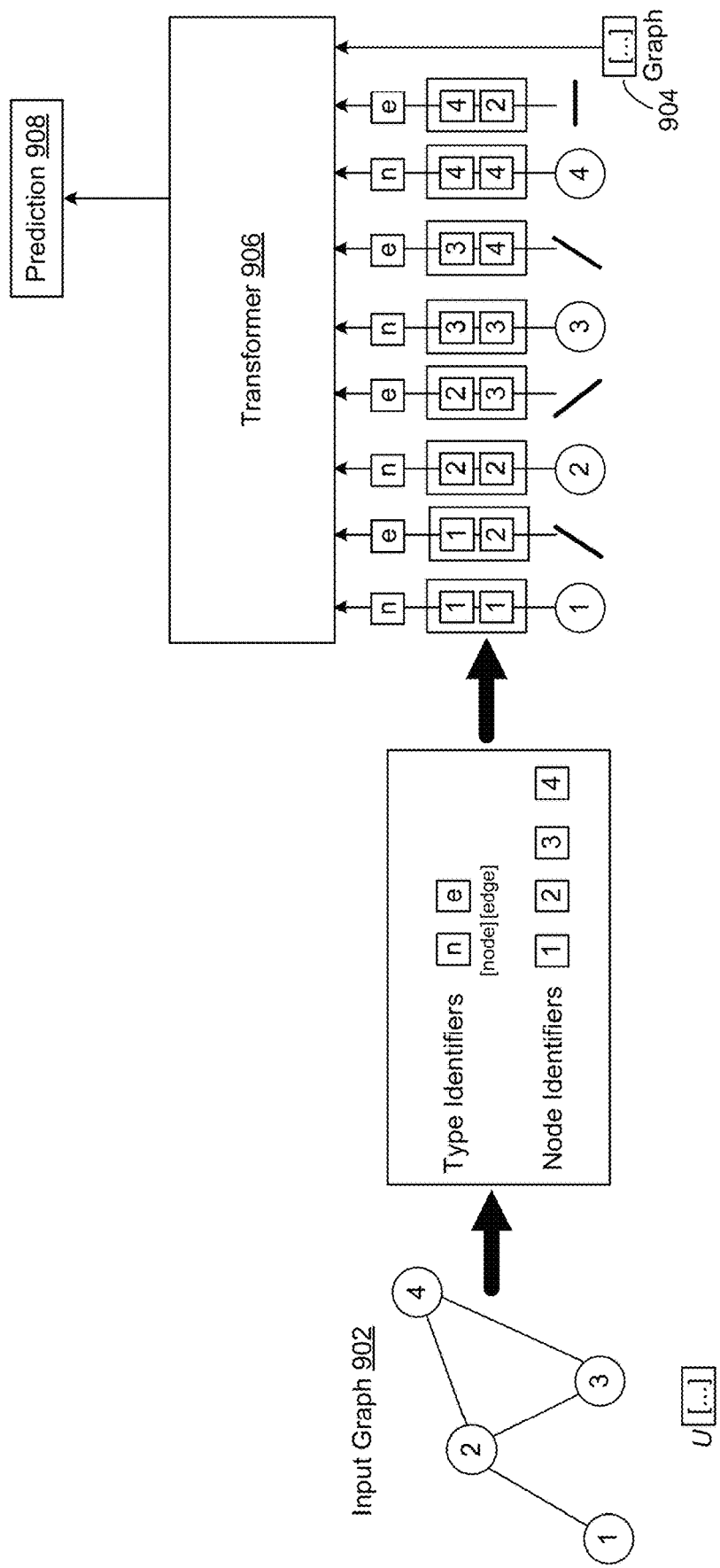
FIG. 9 illustrates an example of encoding the structure of a graph for a transformer to use in behavior-based analysis, in accordance with embodiments of the present disclosure.

FIG. 9 illustrates an example of modeling graph structure for a transformer to use in behavior-based analysis, in accordance with embodiments of the present disclosure.

More specifically, FIG. 9 illustrates an example of how both nodes and edges (e.g., objects and events in a stateful model) can be used as tokens for a transformer.

An input graph 902 is shown with four nodes (node 1, 2, 3, and 4) and four edges. Not shown are the information associated with each node (e.g., information about the corresponding object in the stateful model) and each edge (e.g., information about the corresponding event in the stateful model).

All nodes and edges can be treated as independent tokens. However, in some embodiments, their feature vectors are augmented with token-wise embeddings—more specifically, type identifiers (to encode whether a token is a node or an edge) and a pair of node identifiers (e.g., to represent the connectivity of the tokens, such as the pair of nodes that an edge links). In some embodiments, the ordering of the node identifiers may be used to convey directionality for a directed edge (e.g., 1, 2 may convey that an edge goes from node 1 to node 2). In some embodiments, the feature vectors for edges may also be augmented with order embeddings (not shown), such as to indicate the relative order that the events associated with those edges occurred. Collectively, these embeddings directly provide information about how each token fits within the overall structure and sequence of the graph, thereby reducing the additional encodings that may have to be performed.

Once token-specific information has been embedded into the feature vector for each token (e.g., all the information associated with an event has been embedded into the feature vector for the edge corresponding to that event), the set of feature vectors can be provided to the transformer 906 to transform the vectors and generate a prediction 908. For graph-level prediction tasks, an extra graph-level token 904 can be embedded/encoded and provided to the transformer 906.

There may be numerous benefits to a transformer-based approach for classifying behaviors or threats from stateful model data. First, transformers are well researched with high visibility since the public success of transformer-based models such as Chat-GPT, and there have been many improvements to transformers that have been discovered and made. Accordingly, any improvements to transformers are well known and could potentially be applicable for classifying behaviors or threats using stateful model data.

Additionally, transformers are good at finding suspicious events. For example, language-based transformers have a good understanding an individual word's meaning, which is greatly improved from the context provided by the other words in the sentence. Similarly, transformers adapted for behavior-based analysis of stateful models would have a good understanding of any event that is improved from the context provided by the other events in the stateful model.

Furthermore, transformers can great for describing the "similarity" between stateful models and threats (e.g., associated with different stateful models). There are many approaches for determining semantic similarity, which is a metric defined over a set of documents or terms, where the idea of distance between items is based on the likeness of their meaning or semantic content as opposed to lexicographical similarity. For example, two very different sentences (having different words and structure) may have a very similar meaning. The most straightforward and effective method now is to use a powerful model (e.g. a transformer) to encode sentences to get their embeddings and then use a similarity metric (e.g. cosine similarity) to compute their similarity score that indicates whether two texts have similar or more different meanings. Similarly, a transformer can be used to encode events and stateful models to compute similarity scores indicating whether two stateful models are similar, allowing for similarities between threats (both local and global) to be identified.

However, there may be some drawbacks with such an approach. Compared to other approaches, the finalized transformer model is not lightweight. Even the smallest of saved transformer models have many millions of parameters and require at least a gigabyte or two of storage space.

Furthermore, creating the transformer model is a two-step process. Transformers typically undergo unsupervised pre-training with a very large dataset, followed by post-training (e.g., supervised fine-tuning with labeled training data). The entire process requires a large amount of training data and resources (e.g., compute resources and compute time). It can be difficult to obtain the vast amount of training data required. For example, well known transformer-based models like Chat-GPT were trained on large volumes of text collected from multiple sources on the Internet, and the training process also took several months. Accordingly, such models may also be unwieldy to update over time (e.g., if entirely new kinds of threats and behavioral patterns arise).

Figure 10:
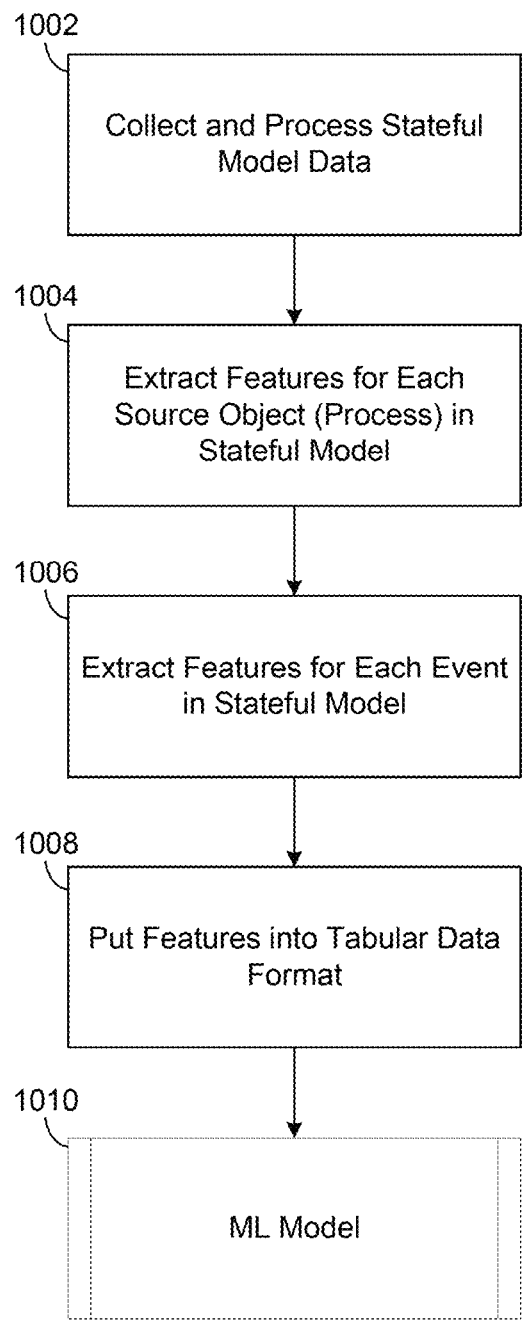
FIG. 10 is a generalized flowchart of converting stateful model data into a tabular data format, in accordance with embodiments of the present disclosure.

FIG. 10 is a generalized flowchart of converting stateful model data into a tabular data format (e.g., a Euclidean format), in accordance with embodiments of the present disclosure.

At block 1002, stateful model data is collected and processed (e.g., by monitoring operations on an endpoint, as described herein). In some embodiments, the stateful model data may be collected and stored in a format such as data table 350, with each row pertaining to an event inside the storyline.

At block 1004, features (e.g., a feature vector) may be extracted for each source object in the stateful model based on at least the stateful model data. In some embodiments, features (e.g., a feature vector) may be extracted for each source process in the stateful model based on at least the stateful model. In other words, each object (or each of a particular type of object) in the stateful model or storyline can be converted into an array of numbers that is a meaningful representation of the respective object.

At block 1006, features (e.g., a feature vector) may be extracted for each event in the stateful model based on at least the stateful model data. In other words, each event (or each of a particular type of event) in the stateful model or storyline can be converted into an array of numbers that is a meaningful representation of the respective event. In some embodiments, this involves extracting statistics for any quantitative data associated with any of the events inside the storyline (e.g., for each row of the data table 350). Examples of the statistics include min, max, mean, and median.

At block 1008, the feature vectors may be put into a tabular data format (e.g., a table or matrix). For example, in some embodiments, some of the feature vectors may be concatenated into a list or matrix. In some embodiments, some of the feature vectors may be modified or combined using with a mathematical operation (e.g., two feature vectors may be summed). As a result, the stateful model ends up being represented by data in a Euclidean format, which can then be used as input to train or apply a machine learning model 1010 for predictive tasks, such as to classify a particular event as suspicious, to classify the entire stateful model as suspicious, and so forth.

In some embodiments, the architecture of the ML model 1010 may comprise one or more tree-based algorithms involving the use of XGBoost, which may leverage the stateful model data (e.g., endpoint data) and corresponding stateful models. XGBoost, or Extreme Gradient Boosting, is a scalable, distributed gradient-boosted decision tree (GBDT) machine learning library. XGBoost provides parallel tree boosting, instead of sequential tree bosting like GBDT and is the leading machine learning library for regression, classification, and ranking problems. A Gradient Boosting Decision Trees (GBDT) is a decision tree ensemble learning algorithm similar to random forest, for classification and regression. Ensemble learning algorithms combine multiple machine learning algorithms to obtain a better model. The term "gradient boosting" comes from the idea of "boosting" or improving a single weak model by combining it with a number of other weak models in order to generate a collectively strong model. Gradient boosting is an extension of boosting where the process of additively generating weak models is formalized as a gradient descent algorithm over an objective function. Gradient boosting sets targeted outcomes for the next model in an effort to minimize errors. Targeted outcomes for each case are based on the gradient of the error (hence the name gradient boosting) with respect to the prediction. GBDTs iteratively train an ensemble of shallow decision trees, with each iteration using the error residuals of the previous model to fit the next model. The final prediction is a weighted sum of all of the tree predictions. Random forest "bagging" minimizes the variance and overfitting, while GBDT "boosting" minimizes the bias and underfitting. XGBoost is a scalable and highly accurate implementation of gradient boosting that pushes the limits of computing power for boosted tree algorithms, being built largely for energizing machine learning model performance and computational speed. With XGBoost, trees are improved with the results of prior trees. It follows a level-wise strategy, scanning across gradient values and using these partial sums to evaluate the quality of splits at every possible split in the training set.

One benefit of this approach is that the resulting model is simple and lightweight (at least, in comparison to the GNN or transformer approaches described herein), and thus it is easier and less resource intensive to train and apply. It is also easier to understand and explain since it involves more commonly used machine learning techniques.

However, the drawback of this approach is that it is more difficult to describe complex features in the data because tabular data is not well-suited for mapping out the complex relationships between objects in a stateful model. Additionally, it cannot be used to assess real similarity between stateful models or to assess the similarity of an observed stateful model to a model storyline encapsulating a behavioral pattern.

Some embodiments herein are directed to systems, methods, and devices for training and utilizing a machine learning (ML) model based on endpoint data. In some embodiments, the endpoint data may be obtained via an Endpoint Protection Platform (EPP), which may be configured, via one or more software agents, to search for attack indicators, investigate existing incidents, perform file integrity monitoring, and identify threats. In some embodiments, the one or more software agents may provide visibility to operating system processes and/or encrypted network traffic of one or more endpoints of a computer network (i.e., endpoint data). In some embodiments, the endpoint data may provide comprehensive insight into all endpoints. In some embodiments, the endpoint data may be provided to users via a dynamic user interface. In some embodiments, the endpoint data collected by the agent may be organized into one or more databases, wherein the databases are configured with full real-time and historic retrospective search capabilities, even for offline endpoints. In some embodiments, the telemetry data collected from endpoints and/or servers may be used to correlate activity, such as lateral movement and callbacks, with other threat indicators. In some embodiments, endpoint data may be collected from all endpoints, including endpoint devices that exist outside of a network perimeter. In some embodiments, each agent creates and aggregates events based on endpoint processes to create an endpoint model or an stateful model, which may be stored in the one or more queryable databases. In some embodiments, connections between events may also be stored in the one or more queryable databases. In some embodiments, an ML model may be generated and trained using endpoint models for various applications.

Some embodiments herein provide advanced detection capabilities, enhanced visibility, and custom detection rules that address new threats or targeted threats. In some embodiments, they systems, methods and devices herein may be configured to allow incorporation of custom detection logic and immediate deployment, automatically mitigating threats and quarantining endpoints. In some embodiments, the systems, methods, and devices herein may be integrated into a security information and event management (SIEM) system to support threat detection, compliance and security incident management through the collection and analysis of security events.

In some embodiments, endpoint data collected via an EPP may be organized into one or more queryable databases. In some embodiments, queries to the one or more databases may be transformed into automated rules that trigger alerts and responses when the rules detect matches in endpoint data. In some embodiments, the systems, methods, and devices may comprise an automated process for reviewing every endpoint event collected across all endpoints and evaluate each of those events against a list of rules.

In some embodiments, each software agent may be configured to build a model, using endpoint data, of a corresponding endpoint infrastructure and real-time running behavior. In some embodiments, an identifier may be assigned to a group of related events within the generated model. In some embodiments, when an abnormal event is identified, the identifier may be used to quickly locate all related processes, files, threads, events, and other data with a single query to the one or more databases. In some embodiments, full, contextualized data may be provided in response to the query, including a root cause behind a threat including context, relationships, and activities. In some embodiments, the model may be continuously updated in real-time as new telemetry data is ingested, providing a full picture or storyline of real-time endpoint activity.

According to some embodiments herein, the endpoint data and corresponding endpoint models constructed using endpoint data may be utilized in connection with a ML model to, for example, classify threats. In some embodiments, the ML model may be used in various applications, such as identifying similar endpoint models that behave the in the same manner, or to identify true positives and false positives of previously identified suspicious indicators.

In some embodiments, the agents of the system may collect data and send the data to a centrally accessible location (e.g., a server, the cloud, etc.) so that the entire network is contextualized and Indicators of Compromise (IoCs) or threats across one or more endpoints (including ones that go offline) can be investigated. In some embodiments, the data collected and sent by the agents may include network traffic, so that there is visibility of all network traffic and any lateral movement within the network can be observed. In other words, the compiled data (e.g., comprised of data collected from endpoints) can be used to correlate activity (such as lateral movement and callbacks) with other threat indicators to gain deeper insights, perform full and filtered IOC searches on all endpoint and network activities, investigate threats at different levels of granularity, and/or initiate containment/mitigation actions.

In some embodiments, the system may be able to collect log entries from many different sources and different formats. In some embodiments, the system may compile data or logs associated with a threat into a threat log. In some embodiments, some features used in the predictive model may be derived from the data found in threat logs collected by the system.

In some embodiments, various events on an endpoint may be monitored and captured by the system and used as features to input into the endpoint model (e.g., stateful model). For example, in some embodiments, the features used by the stateful model may comprise events such as process exit, process modification, process creation, duplicate process handle, duplicate thread handle, open remote process handle, remote thread creation, remote process termination, command script, IP connect, IP listen, file modification, file creation, file modification, file creation, file scan, file deletion, file rename, login, logout, DNS resolved, task register, task update, task start, task trigger, task delete, registry key create, registry key rename, registry key delete, registry key export, and so forth.

Embodiments herein may comprise engineering one or more features from the endpoint data and corresponding endpoint models (e.g., stateful models). In some embodiments, features may be formed from one or more of the functions making up the events. Other features may include, for example, the number of processes in the endpoint data and corresponding stateful models, the number of processes in the endpoint data and corresponding stateful models comprising Living Off the Land Binaries (LOLBins), the number of files in temporary directories and/or in system directories, command line lengths and entropies, the number of network connections, and/or the number of unique behavioral indicators, among others.

In some embodiments, a feature used in the ML model may be the number of processes in a storyline that are LOLBins. A LOLBin (Living Off the Land Binary) is any executable that is already installed on an endpoint but can be adapted or exploited to further an attack. For example, the executable may come installed by default as part of the operating system or it may have been added by a user for legitimate purposes (e.g., as part of a common or widely used third party software installation). A malicious actor may hijack this existing software for malicious purposes. For one, it is less work to adapt existing software than to develop custom malware. Furthermore, the chances of detection may be decreased because the executable is more likely to be trusted and treated without suspicion by both user and admins. In some cases, security tools may even whitelist the executable as benign.

In some embodiments, the system may keep track of a list of commonly-found or well-known LOLBins (e.g., PowerShell, Windows Management Instrumentation, msiexec, psxec, desktopimgdownldr, etc.) and/or executables with functionality and capabilities that can be leveraged for malicious purposes. Accordingly, such a list can be referenced in order to determine the number of processes in a storyline that are LOLBins. The hijacking of LOLBins may be associated with certain behavior patterns (e.g., fileless attacks) associated with malware, and thus the number of processes that are LOLBins may be a useful feature.

In some embodiments, a feature used in the ML model may be, for a storyline, the number of files touched that were in temporary directories. The access or modification of files in temporary directories may be associated with certain behavior patterns associated with malware, and thus the number of files touched in temporary directories may be a useful feature.

In some embodiments, a feature used in the ML model may be, for a storyline, the number of files touched that were in system directories. The access or modification of files in system directories may be associated with certain behavior patterns associated with malware, and thus the number of files touched in temporary directories may be a useful feature.

In some embodiments, some features used in the ML model may include command lines lengths and/or entropies. For example, commands associated with command-line shells (e.g., PowerShell) can be monitored, parsed, and processed (e.g., to determine lengths, entropies, and any other useful information). The use of command-line shells may be associated with certain behavior patterns associated with malware, and thus the lengths and/or entropies of command lines may be a useful feature. In some embodiments, a feature used in the ML model may be the number of network connections involved in the storyline. In some embodiments, a feature used in the ML model may be the number of unique behavior indicators involved in the storyline.

In some embodiments, a user interface (UI) implementing an ML model may be used to identify true positives and false positives according to some embodiments herein. In some embodiments, the ML model may be used to review identified threats or indications of compromise and determine if those threats or indications of compromise (IOCs) are true positives or false positives. In some embodiments, a dynamic UI may generate a list of the threats or IOCs for review of a user, wherein the dynamic UI may comprise a result of the ML model based on the endpoint data and corresponding endpoint models. In other words, the ML model may query the relevant information and reprocess it and extract some prediction, which may be displayed to a user via the dynamic user interface. Using this method, users may be provided with a better understanding of whether certain threats or IOCs are likely to be false positive or true positive.

In some embodiments, the endpoint data and corresponding endpoint models may be used in one or more statistical methods and ML models to assist users in making more informed decisions with respect to identified threats and/or IOCs. In some embodiments, these threats and/or IOCs may be discovered using one or more agents, which monitor one or more endpoints in real time.

In some embodiments, one or more ML models may be used with the endpoint data and corresponding endpoint models. In some embodiments, the one or more ML models may be used to determine what caused specific computer processes to be defined as threats and/or IOCs in a more granular way. In some embodiments, the one or more ML models may be used to determine the similarity between two or more threats and/or IOCs, or between a threat and/or IOC and a legitimate process. In some embodiments, endpoint data and corresponding endpoint models may be stored in one or more databases, such that newly identified threats and/or IOCs may be compared to previous legitimate or illegitimate processes. In some embodiments, the one or more ML models may be especially useful in determining the validity of threats and/or IOCs in edge cases, where previously, user intervention was necessary to determine whether the threats and/or IOCs were true positives or false positives.

In some embodiments, the endpoint data and corresponding endpoint models may be used as an input to one or more ML models. In some embodiments, the endpoint data and corresponding endpoint models may comprise a collection of events occurring on one more endpoints. In some embodiments, each of the events of the collection of events may be very different from each other event of the collection of events. For example, there may be one or more types of events, and in each type of event, there may be one or more different fields, such as words, strings, and/or Boolean fields, among others. Thus, in some embodiments, the endpoint data and corresponding endpoint models may comprise a diverse data set. In some embodiments, to be usable in the one or more ML models, the endpoint data and corresponding endpoint models must be normalized and transformed into one or more features, both for each one of the events and for each aggregation of related events. Thus, in some embodiments, preprocessing of the endpoint data and corresponding endpoint models must be performed before inputting the endpoint data and corresponding endpoint models to the one or more ML models.

In some embodiments, a ML method according to the embodiments herein may comprise engineering one or more features from the endpoint data and corresponding endpoint models. In some embodiments, features may be formed from one or more of the functions making up the events. Other features may include, for example, the number of processes in the endpoint data and corresponding endpoint models, the number of processes in the endpoint data and corresponding endpoint models comprising Living Off the Land Binaries (LOLBins), the number of files in temporary directories and/or in system directories, command line lengths and entropies, the number of network connections, and/or the number of unique behavioral indicators, among others.

In some embodiments, a ML model architecture must be constructed. In some embodiments, the ML model must undergo a training process using a training data set. In some embodiments, the ML model architecture and training process must be designed to minimize and/or eliminate bias in the ML model. For example, overfitting may occur when a model learns the detail and noise in the training data set to the extent that it negatively impacts the performance of the model on new data. This means that the noise or random fluctuations in the training data is picked up and learned as concepts by the model. These concepts may not always apply to new data and negatively impact the model's ability to generalize. Overfitting can pose a significant difficulty as many threats and/or IOCs are similar to one another.

In some embodiments, the model architecture may comprise a graph neural network (GNN) model. A GNN is an optimizable transformation on all attributes of the graph (nodes, edges, global context) that preserves graph symmetries (permutation invariances).

In some embodiments, the approach used for the model architecture may first transform the input data (e.g., endpoint data, storyline data, etc.) into a Euclidean input, such as into tabular data format (e.g., an array or matrix of numbers). Then any suitable traditional machine learning technique can be used to train the model and perform predictive tasks such as threat detection (e.g., by classifying a set of storyline data as a threat). For example, supervised learning techniques can be used, such as decision trees, random forest, gradient boosting, support vector machines, Bayesian networks, regression analysis, and so forth, to teach the model to differentiate between threats and non-threats. Feature learning techniques can be used, such as artificial neural networks, to automatically extra features from the data and to discover better representations of the inputs (e.g., higher-level, more abstract features) provided during training.

In some embodiments, one or more ML models may be used to identify similarities in identified threats and/or IOCs in order to obviate the need for manual review of each threat by a user. For example, in any single corporate network, there may be 10,000 computers and 500 of those computers may be attacked with the same threat. This threat may look slightly different on each of the computers because, for example, the threat comprises a command line argument specific to the name of the machine, the threat may comprise a file that is slightly different for different operating systems, or the threat comprises a file that compiled differently on each computer. Traditionally, each of these threats may be individually elevated for user review. However, in some embodiments, the one or more ML models herein may be able to identify these threats as being substantially identical despite the slight differences inherent to the threats, such that all of the threats may be dealt with collectively, greatly increasing efficiency in detection and response. In some embodiments, the ML models may be used for threat prioritization by collecting general threat metadata, including, for example, information about the account from which the threat arises, information about past threats, and the number of times the specific threat has been identified. In some embodiments, the ML may be used to identify similarities between threats, including local similarities between threats on the same network, and global similarity between threats on different networks. In some embodiments, the ML models may be used for attribution of threats to identify known or unknown repeat attackers.

Computer Systems

Figure 11:
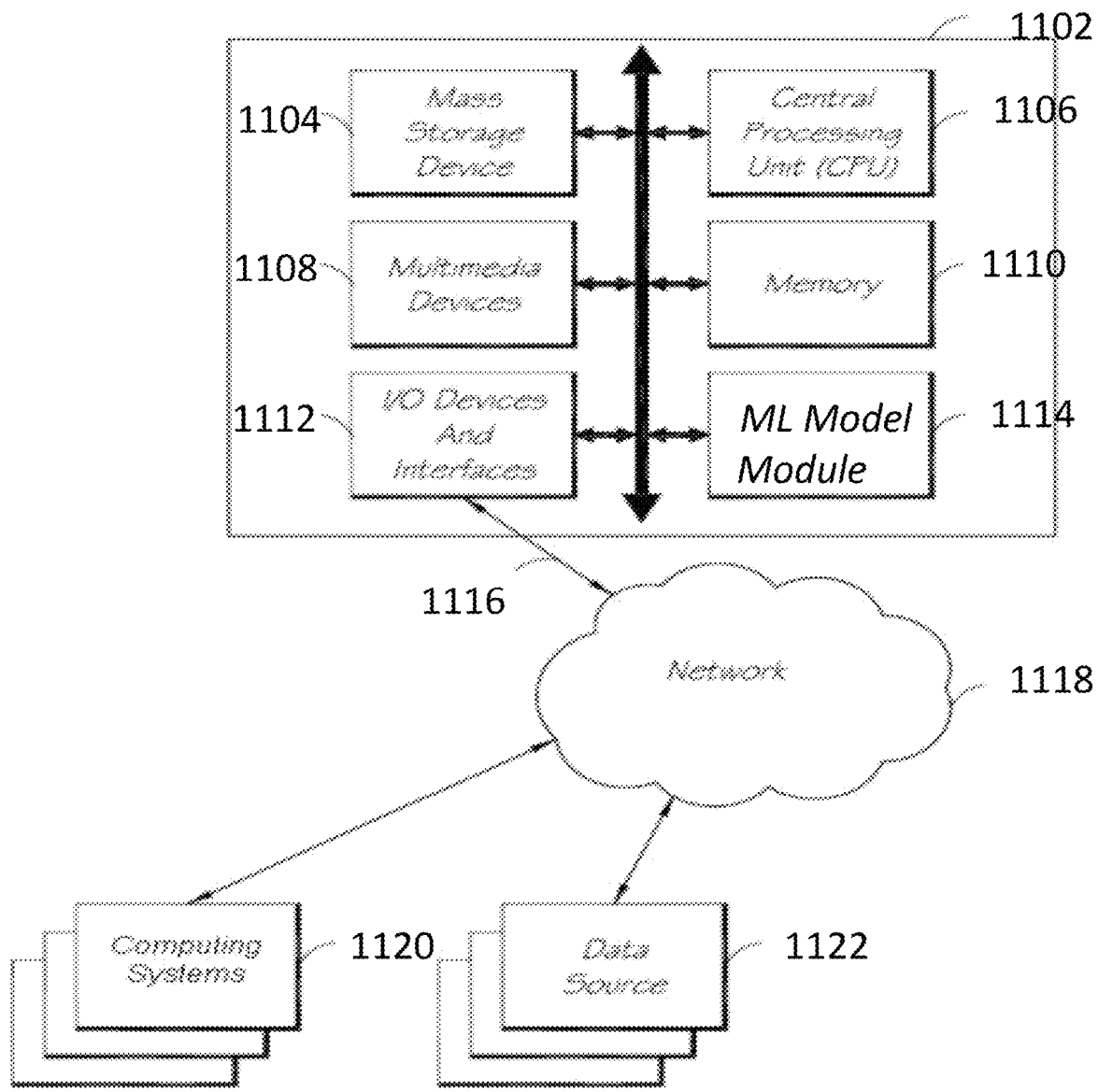
FIG. 11 is a block diagram depicting an embodiment of a computer hardware system configured to run software for implementing one or more embodiments disclosed herein.

FIG. 11 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 11. The example computer system 1102 is in communication with one or more computing systems 1120 and/or one or more data sources 1122 via one or more networks 1118. While FIG. 11 illustrates an embodiment of a computing system 1102, it is recognized that the functionality provided for in the components and modules of computer system 1102 may be combined into fewer components and modules, or further separated into additional components and modules.

The computer system 1102 can comprise an ML Model module 1114 that carries out the functions, methods, acts, and/or processes described herein. The ML Model module 1114 is executed on the computer system 1102 by a central processing unit 606 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1102 includes one or more processing units (CPU) 1106, which may comprise a microprocessor. The computer system 1102 further includes a physical memory 1110, such as random-access memory (RAM) for temporary storage of information, a read only memory (ROM) for permanent storage of information, and a mass storage device 1104, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1102 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1102 includes one or more input/output (I/O) devices and interfaces 1112, such as a keyboard, mouse, touch pad, and printer. The I/O devices and interfaces 1112 can include one or more display devices, such as a monitor, that allows the visual presentation of data to a user. More particularly, a display device provides for the presentation of GUIs as application software data, and multi-media presentations, for example. The I/O devices and interfaces 1112 can also provide a communications interface to various external devices. The computer system 1102 may comprise one or more multi-media devices 1108, such as speakers, video cards, graphics accelerators, and microphones, for example.

The computer system 1102 may run on a variety of computing devices, such as a server, a Windows server, a Structure Query Language server, a Unix Server, a personal computer, a laptop computer, and so forth. In other embodiments, the computer system 1102 may run on a cluster computer system, a mainframe computer system and/or other computing system suitable for controlling and/or communicating with large databases, performing high volume transaction processing, and generating reports from large databases. The computing system 1102 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 1102 illustrated in FIG. 11 is coupled to a network 1118, such as a LAN, WAN, or the Internet via a communication link 616 (wired, wireless, or a combination thereof). Network 1118 communicates with various computing devices and/or other electronic devices. Network 1118 is communicating with one or more computing systems 1120 and one or more data sources 1122. The ML Model module 1114 may access or may be accessed by computing systems 1120 and/or data sources 1122 through a web-enabled user access point. Connections may be a direct physical connection, a virtual connection, and other connection type. The web-enabled user access point may comprise a browser module that uses text, graphics, audio, video, and other media to present data and to allow interaction with data via the network 1118.

Access to the ML Model training module 1114 of the computer system 1102 by computing systems 1120 and/or by data sources 1122 may be through a web-enabled user access point such as the computing systems' 1120 or a personal computer, cellular phone, smartphone, laptop, tablet computer, e-reader device, audio player, or another device capable of connecting to the network 1118. Such a device may have a browser module that is implemented as a module that uses text, graphics, audio, video, and other media to present data and to allow interaction with data via the network 1118.

The output module may be implemented as a combination of an all-points addressable display such as a cathode ray tube (CRT), a liquid crystal display (LCD), a plasma display, or other types and/or combinations of displays. The output module may be implemented to communicate with input devices 1112 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 1102 may comprise a physical or logical connection established between a remote microprocessor and a mainframe host computer for the express purpose of uploading, downloading, or viewing interactive data and databases on-line in real time. The remote microprocessor may be operated by an entity operating the computer system 1102, including the client server systems or the main server system, an/or may be operated by one or more of the data sources 1122 and/or one or more of the computing systems 1120. In some embodiments, terminal emulation software may be used on the microprocessor for participating in the micro-mainframe link.

In some embodiments, computing systems 1120 which are internal to an entity operating the computer system 1102 may access the ML Model module 1114 internally as an application or process run by the CPU 1106.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 1102 may include one or more internal and/or external data sources (for example, data sources 1122). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, and Amazon Timestream.

ADDITIONAL EMBODIMENTS

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may" "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

We claim:

1. A computer-implemented method of detecting malware in real-time in a live environment, the method comprising:
monitoring a sequence of linked operations performed by a program running in the live environment;
generating an event data characterizing each monitored operation, wherein the event data comprises, for each monitored operation, at least an operation type and a source of the operation;
building an updated stateful model in accordance with the event data, wherein the updated stateful model comprises a data structure representing a real-time updated system state resulting from the sequence of linked operations, and wherein the building the updated stateful model comprises:
retrieving one or more objects associated with the event data, each of the one or more objects representing an entity involved in one of the monitored operations, the retrieved one or more objects comprising at least one object for each monitored operation that represents the source of the operation;
determining one or more relationships among the one or more objects in accordance with the event data, the determined relationships comprising at least the type of each monitored operation and one or more interconnections between the objects of one monitored operation and the objects of another monitored operation;
inferring an event context comprising the one or more objects and the determined relationships thereof; and
generating a stateful model comprising the event context if the monitored operation is a first monitored operation or otherwise updating an existing stateful model based at least in part on the event context, thereby building the updated stateful model representing a hierarchical structure comprising one or more entities involved in the sequence of linked operations and interconnections between the one or more entities resulting from the linked operations;
generating a graph data structure corresponding to the updated stateful model, wherein the graph data structure comprises:
a representation of a structure of a graph comprising nodes and edges linking the nodes, wherein the nodes correspond to the one or more entities of the updated stateful model, and wherein the edges correspond to the interconnections between the one or more entities of the updated stateful model;
an embedding for each node comprising information associated with the entity that corresponds to the respective node; and
an embedding for each edge comprising information associated with the interconnection that corresponds to the respective edge;
applying a graph neural network to the graph data structure to transform one or more embeddings in the graph data structure based on the structure of the graph;
applying a machine learning model to the one or more transformed embeddings to identify one or more suspicious behaviors associated with the updated stateful model, wherein the machine learning model is trained to identify suspicious behavior based on graph data structures corresponding to stateful models; and
determining the presence of malware based on the identified one or more suspicious behaviors.

2. The computer-implemented method of claim 1, wherein the one or more objects are of a type selected from a group comprising: a process object, a file object, a network object, a registry object and a windows object.

3. The computer-implemented method of claim 1, wherein the embedding for each node comprises a feature vector associated with the entity that corresponds to the respective node.

4. The computer-implemented method of claim 1, wherein the embedding for each edge comprises a feature vector associated with the interconnection that corresponds to the respective edge.

5. The computer-implemented method of claim 1, wherein a feature used by the machine learning model comprises a number of the one or more entities that are both process objects and LOLbins.

6. The computer-implemented method of claim 1, wherein a feature used by the machine learning model comprises a number of the one or more entities that are file objects in temporary directories.

7. The computer-implemented method of claim 1, wherein a feature used by the machine learning model comprises a number of the one or more entities that are file objects in system directories.

8. A non-transient computer readable medium containing program instructions for causing a computer to perform a method for detecting malware in real-time in a live environment, the method comprising:
monitoring a sequence of linked operations performed by a program running in the live environment;
generating an event data characterizing each monitored operation, wherein the event data comprises, for each monitored operation, at least an operation type and a source of the operation;
building an updated stateful model in accordance with the event data, wherein the updated stateful model comprises a data structure representing a real-time updated system state resulting from the sequence of linked operations, and wherein the building the updated stateful model comprises:
retrieving one or more objects associated with the event data, each of the one or more objects representing an entity involved in one of the monitored operations, the retrieved one or more objects comprising at least one object for each monitored operation that represents the source of the operation;
determining one or more relationships among the one or more objects in accordance with the event data, the determined relationships comprising at least the type of each monitored operation and one or more interconnections between the objects of one monitored operation and the objects of another monitored operation;
inferring an event context comprising the one or more objects and the determined relationships thereof; and
generating a stateful model comprising the event context if the monitored operation is a first monitored operation or otherwise updating an existing stateful model based at least in part on the event context, thereby building the updated stateful model representing a hierarchical structure comprising one or more entities involved in the sequence of linked operations and interconnections between the one or more entities resulting from the linked operations;
generating a graph data structure corresponding to the updated stateful model, wherein the graph data structure comprises:
a representation of a structure of a graph comprising nodes and edges linking the nodes, wherein the nodes correspond to the one or more entities of the updated stateful model, and wherein the edges correspond to the interconnections between the one or more entities of the updated stateful model;

an embedding for each node comprising information associated with the entity that corresponds to the respective node; and an embedding for each edge comprising information associated with the interconnection that corresponds to the respective edge;

applying a graph neural network to the graph data structure to transform one or more embeddings in the graph data structure based on the structure of the graph;

applying a machine learning model to the one or more transformed embeddings to identify one or more suspicious behaviors associated with the updated stateful model, wherein the machine learning model is trained to identify suspicious behavior based on graph data structures corresponding to stateful models; and determining the presence of malware based on the identified one or more suspicious behaviors.

9. The non-transient computer readable medium of claim 8, wherein the one or more objects are of a type selected from a group comprising: a process object, a file object, a network object, a registry object and a windows object.

10. The non-transient computer readable medium of claim 8, wherein the embedding for each node comprises a feature vector associated with the entity that corresponds to the respective node.

11. The non-transient computer readable medium of claim 8, wherein the embedding for each edge comprises a feature vector associated with the interconnection that corresponds to the respective edge.

12. The non-transient computer readable medium of claim 8, wherein a feature used by the machine learning model comprises a number of the one or more entities that are both process objects and LOLbins.

13. The non-transient computer readable medium of claim 8, wherein a feature used by the machine learning model comprises a number of the one or more entities that are file objects in temporary directories.

14. The non-transient computer readable medium of claim 8, wherein a feature used by the machine learning model comprises a number of the one or more entities that are file objects in system directories.

* * * * *